March 5, 1968

J. E. CLIFFORD 3,372,099

ELECTROCHEMICAL MACHINING USING A MULTISEGMENTED
ELECTRODE WITH INDIVIDUAL CURRENT
CONTROL FOR EACH SEGMENT

Filed May 1, 1963

INVENTOR.
JOHN E. CLIFFORD
BY *Gray, Mase & Dunson*
ATTORNEYS

March 5, 1968

J. E. CLIFFORD 3,372,099

ELECTROCHEMICAL MACHINING USING A MULTISEGMENTED
ELECTRODE WITH INDIVIDUAL CURRENT
CONTROL FOR EACH SEGMENT

Filed May 1, 1963

INVENTOR.
JOHN E. CLIFFORD
BY *Gray, Mase & Dunson*
ATTORNEYS

March 5, 1968

J. E. CLIFFORD 3,372,099

ELECTROCHEMICAL MACHINING USING A MULTISEGMENTED
ELECTRODE WITH INDIVIDUAL CURRENT
CONTROL FOR EACH SEGMENT

Filed May 1, 1963

INVENTOR.
JOHN E. CLIFFORD
BY Gray, Mase
& Dunson
ATTORNEYS

March 5, 1968

J. E. CLIFFORD 3,372,099

ELECTROCHEMICAL MACHINING USING A MULTISEGMENTED
ELECTRODE WITH INDIVIDUAL CURRENT
CONTROL FOR EACH SEGMENT

Filed May 1, 1963

INVENTOR.
JOHN E. CLIFFORD

BY Gray, Mase
& Dunson
ATTORNEYS

March 5, 1968

J. E. CLIFFORD 3,372,099

ELECTROCHEMICAL MACHINING USING A MULTISEGMENTED
ELECTRODE WITH INDIVIDUAL CURRENT
CONTROL FOR EACH SEGMENT

Filed May 1, 1963

INVENTOR.
JOHN E. CLIFFORD
BY Gray, Mase
& Dunson
ATTORNEYS

March 5, 1968
J. E. CLIFFORD
3,372,099
ELECTROCHEMICAL MACHINING USING A MULTISEGMENTED
ELECTRODE WITH INDIVIDUAL CURRENT
CONTROL FOR EACH SEGMENT
Filed May 1, 1963
8 Sheets-Sheet 6
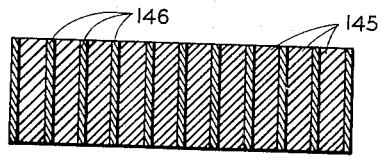
FIG. 16
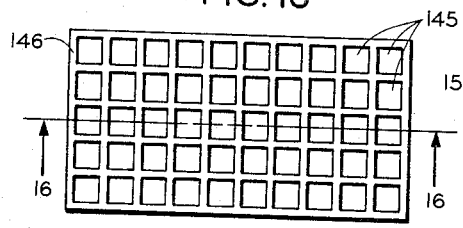
FIG. 17
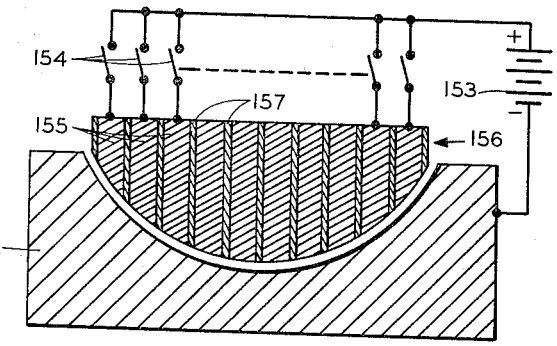
FIG. 21
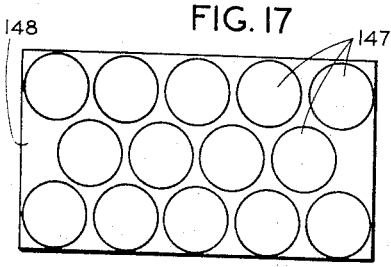
FIG. 18
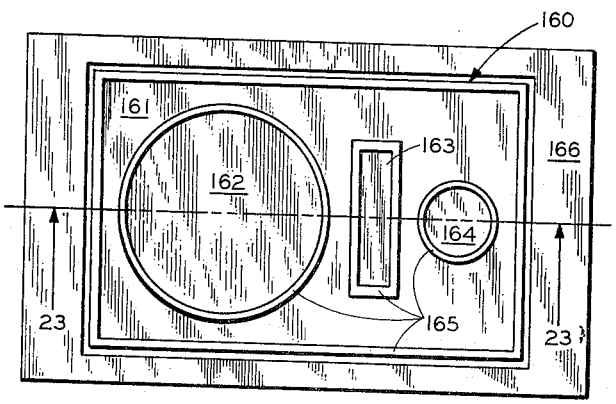
FIG. 22
FIG. 19
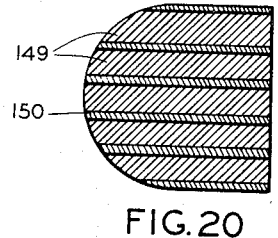
FIG. 20
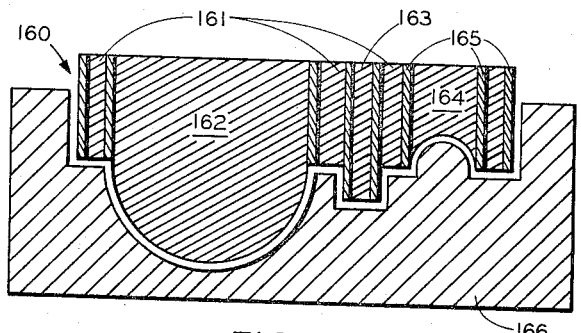
FIG. 23
FIG. 24
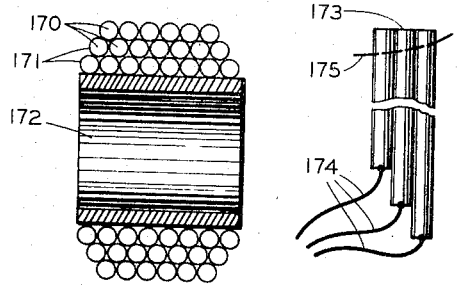
FIG. 25
INVENTOR.
JOHN E. CLIFFORD
BY *Gray, Mase & Dunson*
ATTORNEYS March 5, 1968

J. E. CLIFFORD 3,372,099

ELECTROCHEMICAL MACHINING USING A MULTISEGMENTED
ELECTRODE WITH INDIVIDUAL CURRENT
CONTROL FOR EACH SEGMENT

Filed May 1, 1963

INVENTOR.
JOHN E. CLIFFORD

BY Gray, Mase
& Dunson

ATTORNEYS

March 5, 1968

J. E. CLIFFORD 3,372,099

ELECTROCHEMICAL MACHINING USING A MULTISEGMENTED
ELECTRODE WITH INDIVIDUAL CURRENT
CONTROL FOR EACH SEGMENT

Filed May 1, 1963

INVENTOR.
JOHN E. CLIFFORD

BY *Gray, Mase & Dunson*

ATTORNEYS

United States Patent Office 3,372,099
Patented Mar. 5, 1968

3,372,099
ELECTROCHEMICAL MACHINING USING A MULTISEGMENTED ELECTRODE WITH INDIVIDUAL CURRENT CONTROL FOR EACH SEGMENT
John E. Clifford, 357 Carilla Lane, Columbus, Ohio 43228
Filed May 1, 1963, Ser. No. 277,194
34 Claims. (Cl. 204—143)

This invention relates to the electrolytic removal of material and more particularly to methods and apparatus for the electrochemical machining of conductive materials.

In electrochemical machining as the term is used herein, the workpiece is machined by dissolving it by anodic electrolytic dissolution without direct physical contact between the cathode tool and the anode. Electrochemical machining has great advantages over mechanical machining methods in the production of shapes that are difficult to machine by conventional methods and in the shaping of materials, such as hard and tough metals, that are difficult to machine by conventional methods. Electrolytic machining methods and apparatus with which the present invention is particularly useful are shown in the United States patent application of Charles L. Faust and John A. Gurklis for "Material Removal," Ser. No. 855,873, filed Nov. 27, 1959, now Patent No. 3,095,364, issued June 25, 1963. The invention is also useful in other electrochemical machining operations such as multiple drilling, cutting, and shaping processes.

The invention is particularly useful in the machining of articles with irregular, curved or twisted surfaces such as turbine blades. In conventional electrochemical machining in which a one-piece electrode tool is used to machine a surface to a desired three dimensional shape and contour, a common problem in shaping the workpieces from rough forgings or other blanks is to remove substantial amounts of excess metal from certain areas while removing little or no metal from other areas that are already close to the desired size and shape. In electrochemical machining with a solid tool, material is removed simultaneously not only from the areas containing excess metal, but also (at a slower rate because of the wider gap) from other areas. In such an operation, in order to avoid inaccuracies in the completed workpiece, it is frequently necessary to provide excessive material in the workpiece or blank in order to allow the electrochemical machining action to continue to a position where substantial electrochemical equilibrium is reached across the entire cathode face; i.e., to a position where the gap between the tool and the work and the rate of removal of material from the work become substantially uniform over the entire working face of the cathode tool. The use of excess material results in a waste of expensive material as well as increased cost due to the additional amounts of material that must be removed by electrochemical machining. Sometimes this can be avoided by changing the face of the cathode tool empirically to compensate in advance for the errors that might otherwise occur, but the pre-production trial and error efforts to develop a proper cathode tool shape involve substantial expense.

A principal object of the present invention, therefore, is to reduce the machining envelope that heretofore has been necessary in order to produce a workpiece having the required degree of accuracy, and correspondingly to reduce the amount of material that must be removed by electrochemical machining in order to produce a workpiece of the desired accuracy, thereby saving both material and machining costs. Other objects are the provision of electrochemical machining methods and apparatus providing improved accuracy, greater versatility and various other advantages that are brought out in the detailed description of the invention that follows herein.

A primary feature of the present invention is the use of a tool comprising a plurality of conductive members that are electrically insulated one from another.

A typical method according to this invention of electrolytically removing material from the surface of a workpiece comprises placing such surface in juxtaposition to, but out of contact with, a tool comprising a plurality of conductive members insulated one from another and adapted to provide a desired shape in the workpiece by electrolytic removal of material therefrom, supplying an electrolyte between the juxtaposed surfaces of the tool and the workpiece, advancing the juxtaposed surfaces toward each other, and supplying current through the workpiece, the electrolyte, and at least one conductive member of the tool. According to a preferred form of the invention each conductive member is connected to current when its surface reaches to within a predetermined distance from the surface of the workpiece.

The currents to the conductive members are separately controllable and may be controlled in accordance with a predetermined program, such as a program based on the relative positions of the tool and the workpiece. Where the surfaces are advanced toward each other at a uniform rate the currents may be controlled in accordance with the time during which the surfaces have been so advanced. The currents may be controlled separately responsive to detected values of the distances between the surfaces of the conductive members and the workpiece. The distances may be detected as a function of the resistance of the electrolyte between the workpiece and the individual conductive members, and in various other ways disclosed herein. Separate ballast resistances, one in circuit with each conductive member, may be provided to protect the juxtaposed surfaces from severe damage by arcing.

Other features include: (a) Novel methods of bipolar operation with alternating current, periodically reversed direct current, and three-phase alternating current. (b) Various shapes and arrangements of conductive members in tool electrodes, and materials used on the surfaces thereof. (c) Novel methods of preparing segmented electrodes. (d) Electrodes of variable shape and methods of preparing them.

The invention also comprises methods and apparatus wherein the positions of the conductive members of the tool are separately controllable, and preferably are controlled in accordance with a program determined according to the depth of material to be removed from the workpiece opposite each conductive member. The currents to the conductive members preferably are separately controlled, current ordinarily being connected to each conductive member as it beings its advance toward the workpiece.

Other features and advantages of the invention will become apparent from the following description of typical preferred forms thereof, reference being made to the accompanying drawings in which:

FIGS. 1 and 2 are sectional elevations, somewhat diagrammatic, illustrating apparatus for carrying out the invention as applied to the sinking and shaping of die cavities and the like.

FIG. 4 is a sectional elevation, somewhat diagrammatic, illustrating apparatus for carrying out the invention as applied to the machining of turbine blades and the like.

FIG. 16 is a sectional view taken as indicated at 16—16 in FIG. 17.

FIG. 17 is an end view of a typical tool electrode useable in carrying out the invention.

FIG. 18 is an end view of another such tool.

FIG. 19 is an end view of still another such tool.

FIG. 20 is a sectional view taken as indicated at 20—20 in FIG. 19.

FIG. 21 is an elevational section and diagrammatic view of apparatus and circuitry useable in carrying out various features of the invention.

FIG. 22 is a top view of apparatus illustrating certain features of the invention.

FIG. 23 is a sectional view taken as indicated at 23—23 in FIG. 22.

FIG. 24 is a sectional view illustrating a method of preparing an electrode according to the present invention.

FIG. 25 is a side view of an electrode so prepared.

Figure 1:
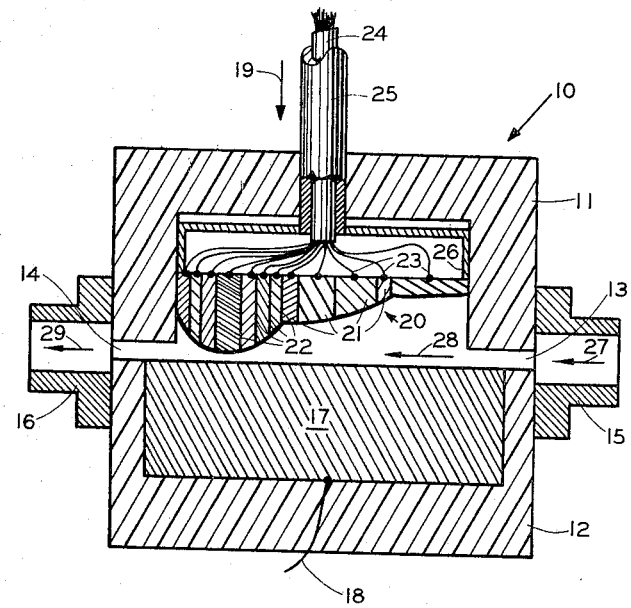
Figure 2:
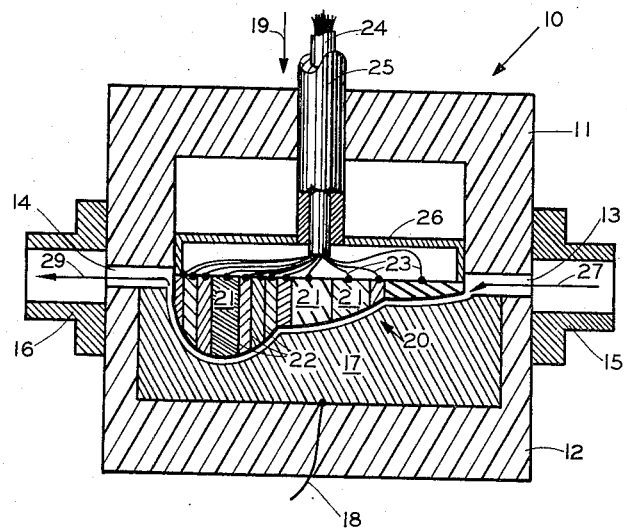
Figure 4:
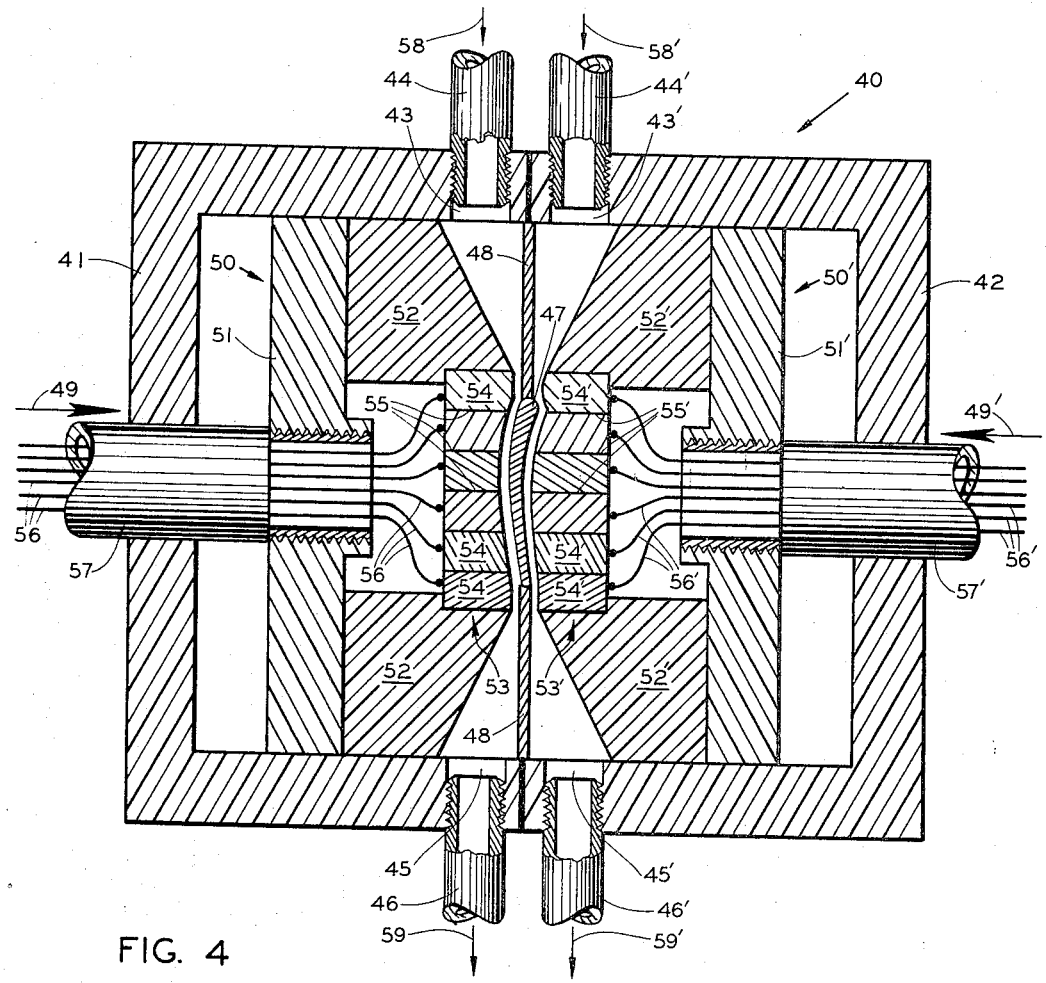

Typical forms of this invention may employ tools and associated apparatus of the types shown in FIGS. 1, 2, and 4. For shaping a single surface, as in making dies and other cavities, the apparatus of FIGS. 1 and 2 may be used. This comprises an enclosure box 10 having an upper portion 11 and a lower portion 12, fastened together in liquid-tight manner. The box 10 has an inlet opening 13 and an outlet passage 14 for electrolyte. The enclosure portions 11 and 12 preferably are made of a strong plastic such as polystyrene or other suitable insulating material. An inlet connector 15 and an outlet connector 16 are provided for convenience in connecting the inlet 13 and the outlet 14 to hoses or other conduits conveying electrolyte to and from the enclosure 10.

Fixedly held in the lower portion 12 is a workpiece 17 to which electrical connection is made by a conductor 18. Snugly fitting in the upper portion 11, but vertically slidable therein as indicated by the arrow 19, is a tool 20 comprising a plurality of conductive members 21, which are insulated one from another. The insulation between the conductive members 21 is represented by the heavy lines 22 between them, since there is not enough space for a more detailed representation. The insulation 22 between the conductive members 21 may be made of polytetrafluoroethylene (Teflon) or any other suitable insulating material. Electric current is supplied to the conductive members 21 by separate conductors 23 connected individually thereto. The conductors 23, which are insulated one from another, pass through the enclosure 10 in a protective insulating sleeve 24 inside a hollow rod 25. The tool advancing rod 25 is fixedly attached to a backing enclosure 26, preferably made of strong plastic or other insulating material, which is fixedly connected to the rigid assembly of conductive members 21 of the tool 20. The movement of the tool advancing rod 25 may be controlled by any convenient means, conventional or otherwise, such as the common lathe type feeding apparatus of the aforesaid Faust and Gurklis patent. Electrolyte is supplied under pressure through the connector 15 and the inlet 13, as is indicated by the horizontal arrow 27. The electrolyte fills the space between the workpiece 17 and the tool 20 and flows across the work, as indicated by the arrow 28, to the outlet 14 and on through the connector 16, as indicated by the horizontal arrow 29. The electrolyte may be supplied to the enclosure 10 by any convenient means, conventional or otherwise, such as a motor driven pump, there being a sump to receive the electrolyte discharged from the outlet 14.

Figure 3:
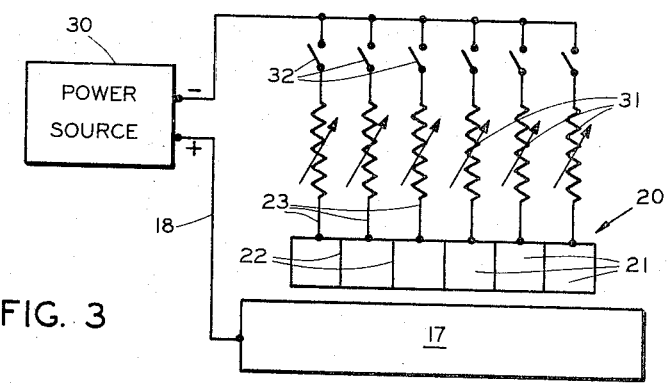
FIG. 3 is a diagram showing typical electrical circuitry used with the apparatus of FIGS. 1 and 2.

FIG. 3 shows a typical electric circuit for the equipment of FIGS. 1 and 2. The workpiece 17 is connected by the conductor 18 to one terminal of a power source 30, which typically comprises a low voltage high amperage supply of direct current with the workpiece 17 connected to the positive terminal as is indicated in FIG. 3. The power source 30 may, however, contain means for providing variations such as periodic reversal if desired for particular purposes. Each conductive member 21 of the tool 20 is connected by its conductor 23 to a resistance 31, which is connected through a switch 32 to the other terminal of the power source 30. The resistances 31 typically are variable as shown in FIG. 3, making it possible to equalize or otherwise adjust the voltages and currents to the individual conductive members 21. The switches 32 typically are operated independently of one another to control the connection of current to the conductive members 21 individually.

FIG. 4 shows apparatus that is useful in shaping two surfaces, preferably at the same time, as in shaping opposite sides of a turbine blade to close tolerances. An enclosure box 40 comprises a left side portion 41 and a right side portion 42, fastened together in liquid-tight manner. The enclosure portions 41 and 42 preferably are made of a strong plastic such as polystyrene or other suitable insulating material. The left side portion 41 has an inlet opening 43 adapted to receive a threaded end connector of a conduit 44 for supplying electrolyte thereto. The left side portion 41 also has an outlet passage 45 similarly adapted to receive the threaded end connector of a conduit 46 for conveying electrolyte away from the enclosure 40.

A workpiece 47 is fixedly held approximately in the middle of the enclosure 40 by supporting members 48, which may be made of strong conductive material or strong insulating material, depending upon whether it is desired to make electrical connection to the workpiece 47, or depending on other factors of convenience in a particular installation. Snugly fitting in the left side portion 41, but horizontally slidable therein, as indicated by the horizontal arrow 49, is a tool holder 50 comprising a backing support member 51 and holding members 52 rigidly connected thereto. The backing and holding members 51 and 52 preferably are made of strong plastic or other insulating material. Rigidly fastened in the holding members 52 of the tool holder 50 is a tool 53 comprising a plurality of conductive members 54, which are insulated one from another. The insulation, represented for convenience by the heavy lines 55, may be made of polytetrafluoroethylene (Teflon) or any other suitable insulating material. Electric current is supplied to the conductive members 54 by separate conductors 56 connected individually thereto. The conductors 56 are provided with coatings of insulating material to insulate them one from another, and they pass through the enclosure 40 inside a hollow rod 57. The tool advancing rod 57 is fixedly attached to the backing support member 51.

The right side portion 42 of the enclosure 40 has an inlet opening 43' adapted to receive a threaded end connector of a conduit 44' for supplying electrolyte thereto. The right side portion 42 also has an outlet passage 45' similarly adapted to receive the threaded end connector of a conduit 46' for conveying electrolyte away from the enclosure 40.

Snugly fitting in the right side portion 42, but horizontally slidable therein, as indicated by the horizontal arrow 49', is a tool holder 50' comprising a backing support member 51' and holding members 52' rigidly connected thereto. The backing and holding members 51' and 52' preferably are made of strong plastic or other insulating material. Rigidly fastened in the holding members 52' of the tool holder 50' is a tool 53' comprising a plurality of conductive members 54', which are insulated one from another. The insulation is represented for convenience by the heavy lines 55'. Electric current is applied to the conductive members 54' by separate conductors 56' connected individually thereto. The conductors 56' are provided with coatings of insulating material to insulate them one from another, and they pass through the enclosure 40 inside a hollow cylindrical rod 57'. The tool advancing rod 57' is fixedly attached to the backing support member 51'. The movement of the tool advancing rods 57 and 57' may be controlled by any convenient means, conventional or otherwise, such as the simple double-cam feeding arrangement of the Faust and Gurklis patent.

Electrolyte is supplied under pressure to the left hand portion 41 of the enclosure 40, as is indicated by the vertical arrow 58, through the conduit 44 and the inlet opening 43, filling the space from the supporting members 48 and the workpiece 47 to the holding members 52 and the tool 53, and flowing down through the gap therebetween and out through the outlet passage 45 and the conduit 46, as is indicated by the vertical arrow 59. Similarly, electrolyte is supplied under pressure to the right hand portion 42 of the enclosure 40, as is indicated by the vertical arrow 58', flowing through the conduit 44' and the inlet opening 43', filling the space from the supporting members 48 and the workpiece 47 to the holding members 52' and the tool 53', and flowing down through the gap therebetween and out through the outlet passage 45' and the conduit 46', as is indicated by the vertical arrow 59'. The electrolyte may be supplied to the enclosure 40 by any convenient means, conventional or otherwise, such as the usual sump and pump of the Faust and Gurklis patent.

Figure 5:
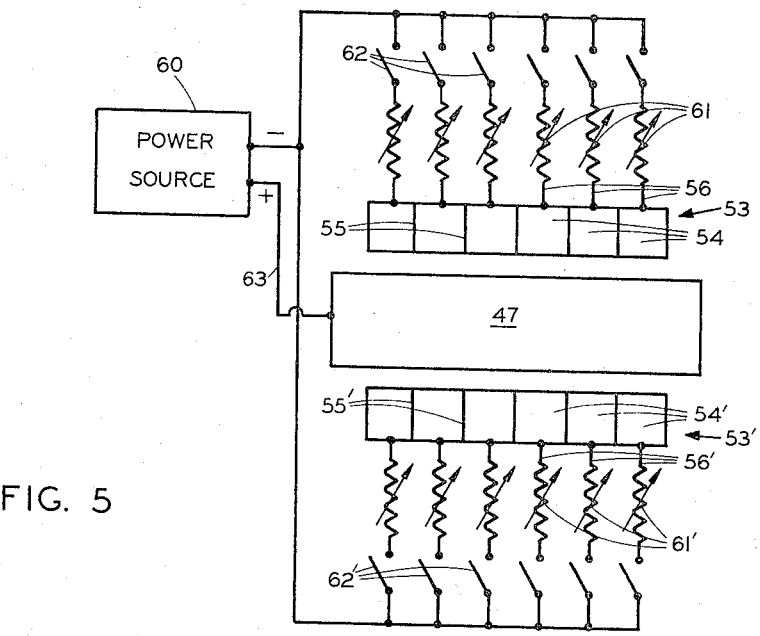
FIGS. 5 and 6 are diagrams showing typical circuitry as used with the apparatus of FIG. 4.

FIG. 5 shows a typical electrical circuit for the equipment of FIG. 4. The workpiece 47 is connected by a conductor 63 to one terminal of a power source 60, which typically comprises a low voltage high amperage supply of direct current with the workpiece 47 connected to the positive terminal as is indicated in FIG. 5. The power source 60 may however contain means for providing variations such as periodic reversal if desired for particular purposes. Each conductive member 54 of the tool 53 is connected by its conductor 56 to a resistance 61, which is connected through a switch 62 to the other (negative) terminal of the power source 60. The resistances 61 typically are variable as shown in FIG. 5, making it possible to equalize or otherwise adjust the voltages and currents to the individual conductive members 54. The switches 62 typically are operated independently of one another to control the connection of current to the conductive members 54 individually. Each conductive member 54' of the tool 53' is connected by its conductor 56' to a resistance 61', which is connected through a switch 62' to the other (negative) terminal of the power source 60. The resistances 61' typically are variable as shown in FIG. 5, to equalize or otherwise adjust the voltages and currents to the individual conductive members 54'. The switches 62' typically are operated independently of one another to control the connection of current to the conductive members 54' individually.

Figure 6:
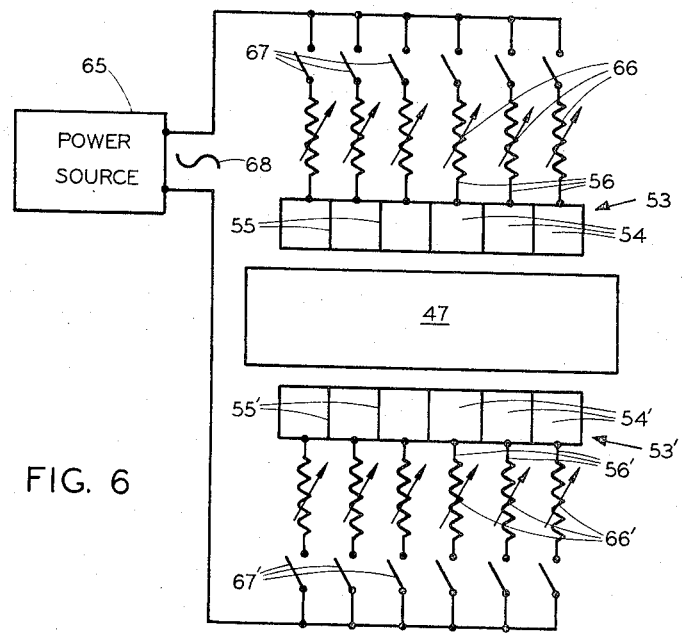

FIG. 6 shows another typical electric circuit that can be used for the equipment of FIG. 4. Each conductive member 54 of the tool 53 is connected by its conductor 56 to a resistance 66, which is connected through a switch 67 to one terminal of a power source 65. The resistances 66 typically are variable as shown in FIG. 6, making it possible to equalize or otherwise adjust the voltages and currents to the individual conductive members 54. The switches 67 typically are operated independently of one another to control the connection of current to the conductive members 54 individually. Each conductive member 54' of the tool 53' is connected by its conductor 56' to a resistance 66', which is connected through a switch 67' to the other terminal of the power source 65. The resistances 66' typically are variable as shown in FIG. 6, making it possible to equalize or otherwise adjust the voltages and currents to the individual conductive members 54'. The switches 67' typically are operated independently of one another to control the connection of current to the conductive members 54' individually. The workpiece 47 is not connected to the power source 65, but functions as a bipolar electrode between the tools 53 and 53' in the manner described in the copending United States patent application Ser. No. 181,717 of John E. Clifford for "Electrolytic Erosion." As is indicated at 68, the power source 65 typically comprises a low voltage high amperage supply of alternating current, which may be of ordinary commercial frequency, or of direct current that is periodically reversed, so that the conductive members 54 and the lower surface of the workpiece 47 are alternately cathodic and anodic while the conductive members 54' and the upper surface of the workpiece 47 are alternately anodic and cathodic. The conductive members 54 and 54' should have surfaces of platinum or other conductive material that is resistant to anodic dissolution in the electrolyte and under the conditions employed. The circuit of FIG. 6 is preferable to that of FIG. 5 where it is inconvenient to make electrical connection to the workpiece 47 and where it is desirable to avoid currents having components of high density through small cross sections of the workpiece, such as would be present in electrochemical machining of thin turbine blades using the circuit of FIG. 5. Other advantages of bipolar operation are brought out in the copending patent application of Clifford mentioned above.

A typical method according to the present invention of electrolytically removing material from the upper surface of the workpiece 17 in the apparatus of FIGS. 1–3 comprises placing the workpiece 17 in the enclosure 10 with its upper surface in juxtaposition to but out of contact with the tool 20 comprising a plurality of conductive members 21 insulated from one another as is indicated at 22 and adapted to provide a desired shape (as is indicated by the shape of the lower surface of the tool 20) in the workpiece 17 by electrolytic removal of material therefrom, supplying an electrolyte, as is indicated by the arrows 27, 28, and 29, between the juxtaposed surfaces of the tool 20 and the workpiece 17, advancing the juxtaposed surfaces toward each other, and supplying current through the workpiece 17, the electrolyte, and at least one conductive member 21 of the tool 20, as by the circuit of FIG. 3.

Current is connected to each conductive member 21 of the tool 20 when its surface reaches to within a predetermined distance (ordinarily not more than about 30 mils) from the surface of the workpiece 17. The currents are connected by closing the switches 32 at the proper times, either manually or automatically. The switches 32 may be thrown individually and thus the currents connected to the conductive members 21 are separately controllable. Control of the currents may comprise simply switching the individual currents on and off, or it may also include control of the magnitude of the current, as by manual or automatic adjustment of the individual variable resistances 31. The currents to the conducted members may be controlled in accordance with a predetermined program.

The currents to the conductive members 21 of the tool 20 may be controlled in accordance with the relative positions of the tool 20 and the workpiece 17. When the tool 20 and the workpiece 17 are in the relative positions shown in FIG. 1, current is connected only to the lowest extending conductive member 21. As the tool 20 advances downwardly, material is removed from the workpiece 17 in the region opposite the lowest extending conductive member 21. Adjacent conductive members 21 then come within the desired gap spacing and current is connected to them also. As the tool 20 continues its downward advance, current is connected to more and more conductive members 21. Finally current is connected to all of them by the time the conductive member 21 at the right end, which is the last to approach close proximity to the workpiece 17, comes within the desired gap distance. Thereafter all of the conductive members 21 remain connected to the power source until the tool 20 has advanced to the position shown in FIG. 2, where the cavity in the workpiece 17 has been provided with the desired shape and depth, the gap being substantially the same throughout the juxtaposed surfaces of the tool 20 and the workpiece 17.

The switches 32 are then opened to disconnect all of the conductive members 21, the supply of electrolyte is shut off, and the tool 20 is retracted upward to the position shown in FIG. 1. The lower portion 12 is separated from the upper portion 11 of the enclosure 10 and the workpiece 17 is removed therefrom and is disconnected from the conductor 18. A new workpiece 17 is connected to the conductor 18 and is placed in the lower portion 12 of the enclosure 10. The portions 11 and 12 are fastened together, the supply of electrolyte is turned on, and the process is repeated.

The apparatus of FIGS. 4 and 5 is employed in like manner to carry out the method as described above, in duplicate, and preferably simultaneously, on the opposite surfaces of the workpiece 47. Where the circuit of FIG. 6 is used rather than that of FIG. 5, the method is carried out in the same way, except that the closest conductive member 54 and the closest conductive member 54' on opposite sides of the workpiece 47 are connected simultaneously by their respective switches 67 and 67' to the power source 65 to provide a complete circuit for current through the bipolar workpiece 47. Preferably, the next conductive member 54 or 54' to reach within the predetermined gap distance is connected to the power source 65 at the same time as the next closest conductive member 54, or 54 on the opposite side of the workpiece 47, in order to equalize the currents through the individual conductive members 54 and 54'. Similarly, as more conductive members 54 and 54' reach to within the predetermined gap distance, current is preferably connected to the conductive members 54 and 54' in pairs, one conductive member on each side of the bipolar workpiece 47, to maintain an approximate balance of current through the individual members 54 and 54'. Where it is permissible or preferable, however, to have different currents in different conductive members 54 and 54', the currents may be connected in various other ways. Most of the methods of controlling the individual currents and other features of the invention are described only in connection with the apparatus of FIGS. 1–3. The method and other features are easily adapted for use with the apparatus of FIGS. 4–6 merely by duplication and other minor modifications within the ordinary skill of the art.

In some special cases, a highly skilled and experienced operator can control the individual currents to the conductive members, preferably with the aid of occasional current measurement, without having prepared a specific plan beforehand. Ordinarily, however, it is preferably to operate in accordance with a predetermined program for connecting current to each conductive member of the tool when its surface reaches to within a predetermined distance from the surface of the workpiece. Referring to FIGS. 1–3 and 7, the currents may be controlled in a simple manner in accordance with the relative positions of the tool and workpiece. Since the upper surface of the workpiece 17 is substantially flat and the shape of the tool 20 is known, current may be connected to the various individual conductive members 21 of the tool 20 when the tool advancing rod 25 reaches various predeterminable respective positions.

Figure 7:
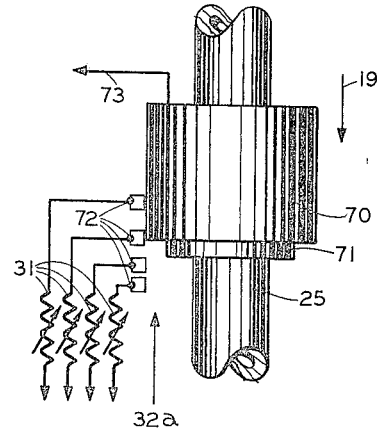
FIG. 7 is an elevational view, somewhat diagrammatic, showing a switching device useable with the apparatus and circuits of FIGS. 1–6.

The principle is illustrated schematically in FIG. 7. The switches of FIG. 3 are combined into a single pole multiple contact type of switch 32a as shown in FIG. 7, comprising a movable contact 70 fixedly attached to an insulating sleeve 71 adjustable on the rod 25, but fastened in a fixed position thereon, and a plurality of fixed contacts 72, one connected to each resistance 31. The movable contact 70 is connected by a conductor 73 to the negative terminal of the power source 30 of FIG. 3, and the resistances 31 are connected to the individual conductive members 21 of FIG. 3. The fixed contacts 72 are positioned such that the movable contact 70 contacts each of the fixed contacts 72 respectively, when the conductive member 21 connected thereto through its resistance 31 reaches to within the predetermined gap distance from the surface of the workpiece 17.

The positions of the fixed contacts 72 relative to one another are determined from the shape of the tool 20. The position of the assembly of fixed contacts 72 relative to the movable contacts 70 on the tool advancing rod 25 is determined by locating the proper position for the upper contact 72, which is, of course, connected to the lowest extending conductive member 21 of the tool 20. This can be done simply by advancing the rod 25 until the lowest extending conductive member 21 just contacts the surface of the workpiece 17, and then adjusting the relative positions of the contacts 70 and 72 such that the movable contact 70 first contacts the upper fixed contact 72 at the predetermined desired gap distance up from this position of the tool 20 and advancing rod 25. Finer adjustments and greater accuracy can be obtained of course by driving the movable contact 70 through reduction gearing between it and the tool advancing rod 25 rather than mounting it directly thereon as shown for simplicity in FIG. 7. Other obvious refinements of detail may also be provided. For example, the contacts 70 and 72 of the switch 32a could be connected to relays for actuating the individual switches 32 of FIG. 3, and thus would not be subjected to the large currents required in the electrochemical machining process.

Figure 8:
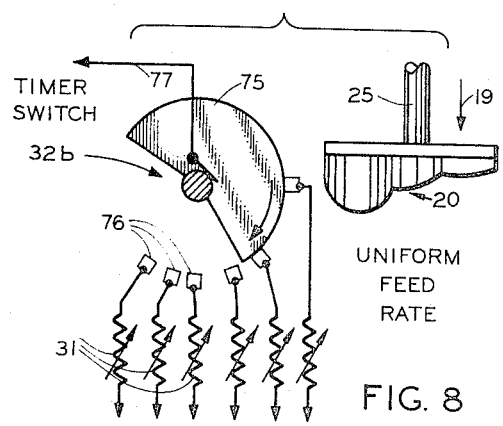
FIG. 8 is an elevational view, somewhat diagrammatic, showing another switching device useable with the apparatus and circuits of FIGS. 1–6.

FIG. 8 schematically illustrates an arrangement wherein the juxtaposed surfaces of the tool 20 and the workpiece 17 are advanced toward each other at a uniform rate and the currents are controlled in accordance with the time during which the surfaces have been so advanced. The switch 32a of FIG. 7 is replaced in the circuit of FIG. 8 by a timer switch 32b having a rotatable contact 75 and a plurality of fixed contacts 76. The rotatable contact 75 is connected by a conductor 77 to the negative terminal of the power source 30 of FIG. 3, and the fixed contacts 76 are connected to the resistance 31, one contact to each resistance. The resistances 31 are connected to the individual conductive members 21 of FIG. 3. The advancing rod 25 of the tool 20 is driven as is indicated by the arrow 19 at a predetermined uniform rate, and the rotatable contact 75 of the timer switch 32b is rotated at a predetermined uniform rate. The fixed contacts 76 are positioned such that, with the tool advancing rod 25 and the rotatable contact 75 started at the predetermined proper relative positions and fed at their respective predetermined uniform rates, the rotatable contact 75 contacts each of the fixed contacts 76, respectively, when the conductive member 21 connected thereto through its resistance 31 reaches to within the predetermined gap distance from the surface of the workpiece 17. The positions of the fixed contacts 76 relative to one another are determined from the shape of the tool 20, while the speeds and starting positions of the tool advancing rod 25 and the rotatable contact 75 are determined by simple calculation and adjustment. Once it is calibrated for a given tool 20, the system can be used repeatedly, providing accurate and reproducible finished products.

While the automatic controls of FIGS. 7 and 8 are ordinarily preferred, the method illustrated in FIG. 7 can be duplicated by throwing the respective switches 32 manually when the tool advancing rod 25 reaches the proper predetermined positions as observed on a dial indicator or on other conventional position indicating means. Similarly, the method illustrated by the system of FIG. 8 can be duplicated manually by throwing the respective switches 32 at the proper predetermined times as indicated on a stop watch or other timing means.

Figure 9:
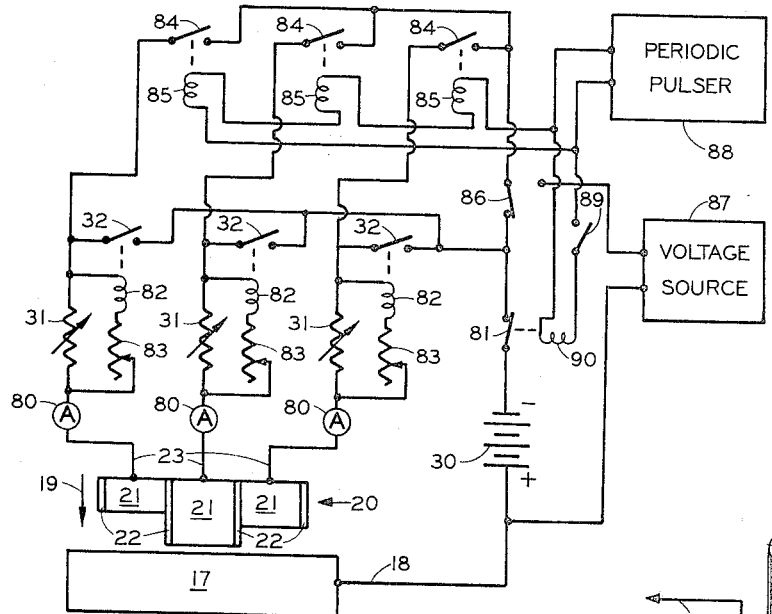
FIG. 9 is a schematic diagram comprising circuitry useable in carrying out the invention, as with the apparatus of FIGS. 1, 2, and 4.

FIG. 9 shows a circuit similar to that of FIG. 3 but with apparatus added whereby the currents connected to the conductive members of the tool are controlled separately responsive to detected values of the distances between the surfaces of the conductive members and the workpiece. As in the circuit of FIG. 3, the workpiece 17 is connected by the conductor 18 to the positive terminal of the power source 30, and each conductive member 21 of the tool 20 is connected by its conductor 23 to a resistance 31, which is connected through a switch 32 to the negative terminal of the power source 30. The circuit of FIG. 9 also contains a current meter 80 (such as an ammeter or a milliammeter, and may be a recording meter) between each conductor 23 and resistance 31, and a switch 81 between the power source 30 and the switches 32. A relay solenoid 82 and an adjustable resistance 83 are connected across each resistance 31, the relay solenoid 82 being positioned to actuate its associated normally open switch 32 when a predetermined desired current flows to its associated conductive member 21 of the tool 20.

Connected to the upper end of each resistance 31 is a switch 84 actuated by a solenoid 85 to make connection to a single-pole double-throw switch 86. With the switches 81 and 86 in the position shown in FIG. 9, the switches 84 are connected to the negative terminal of the power source 30. With the switch 86 in its other position, the switches 84 are connected to one terminal of a voltage source 87, the other terminal of which is connected to the workpiece 17. A periodic pulser 88 energizes the solenoids 85 at predetermined intervals causing them to close the normally open switches 84. When the switch 89 is closed, the periodic pulser 88 also energizes the solenoid 90 causing it to open the normally closed switch 81.

The circuit of FIG. 9 may be used for controlling the currents connected to the conductive members of the tool separately responsive to detected values of the distances between the surfaces of the conductive members and the workpiece. The distances between the workpiece and the individual conductive members are detected as a function of the resistance of the electrolyte therebetween. The resistance of the electrolyte between the workpiece and a given conductive member is measured periodically by applying a known voltage therebetween and measuring the resulting current. At predetermined intervals, the periodic pulser 88 energizes the solenoids 85, causing them to close the switches 84 applying voltage to the conductive members 21 from the power source 30 while the solenoids 85 are energized by the pulse from the periodic pulser 88. The voltage preferably is applied for a time that is less than one-tenth of the period between successive applications of the voltage. Thus, the periodic pulser 88 may typically supply a one-second pulse every fifteen seconds, causing the voltage to be applied to the conductive members 21 through the switches 84 one-fifteenth of the time.

The current through each conductive member 21 flows also through the resistance 31 and the current meter 80 connected in series therewith. The voltage drop across the resistance 31 is applied to the solenoid 82 and adjustable resistance 83 connected thereto. The resistance 83 is adjusted so as to cause the solenoid 82 to close the switch 32 when the current through the meter 80 and conductive member 21 equals or exceeds a predetermined magnitude that is obtained when the surface of the conductive member 21 reaches to within the predetermined desired gap distance from the surface of the workpiece 17.

As the tool 20 advances toward the workpiece 17, the middle conductive member 21 is the first to reach to within the desired gap distance. At this time, the current through it and its resistance 31 is large enough to cause a voltage drop across the solenoid 82 sufficient to cause it to close the switch 32 associated with the middle conductive member 21. As long as no unusual conditions arise, the gap remains approximately the same and the voltage source 30 remains connected to the middle conductive member 21 through its switch 32, which is held in the closed position by the solenoid 82. The solenoids 82 and associated switches 32 preferably are designed so that the switch 32 can be held closed with a slightly smaller current to the conductive member 21 than is required to close the switch 32 in the first place. This avoids the erratic operation that might result from slight changes in current if the system were overly sensitive.

Later the right-hand conductive member 21 reaches to within the desired gap distance and is connected to the power source 30 through its switch 32 from then on. Still later, the left-hand conductive member 21 is connected to the power source 30 through its switch 32. The action of each solenoid 82 provides a measure of the resistance of the electrolyte and controls the current to its conductive member 21 on a "go"–"no-go" basis. Where it is desired to vary the magnitude of the current as well as to control the switching to the power source 30, the solenoid 82 may be replaced by or combined with a servo-system to control the adjustment of the variable resistance 31.

While automatic control is ordinarily preferred, the currents can be controlled manually by an operator who closes the switches 32 periodically and reads the meters 80, leaving the switch 32 closed if the current equals or exceeds a predetermined magnitude. The operator may also adjust the resistances 31 from time to time if desired. For manual control, much of the circuitry of FIG. 9 is not required. In fact, the circuit of FIG. 3 with a meter connected in series with each conductive member 21 is enough for manual control. To simplify the control of the currents, the conductive members 21 may be constructed such that each has the same surface area in contact with the electrolyte. The circuit of FIG. 9 may be used where the surface areas are different, however, since the operation of each solenoid 82 is easily adjusted by its associated adjustable resistance 83.

Where it is preferred not to use the same power source 30 for electrolytically removing material and for detecting the gap distance, the switch 86 can be thrown to its other position in which it connects the switches 84 to the voltage source 87. Ordinarily it is desirable also to close the switch 89, so that the periodic pulser 88 will cause the solenoid 90 to open the switch 81 and disconnect the power source 30 from the circuit during the periodic intervals when the voltage source 87 is connected in the circuit through the switches 84. The operation is similar to that described immediately above, except that the voltage supplied by the source 87 may be different in magnitude, or in type, or both, from that of the power source 30, and the switches 32 are designed to be responsive to the solenoids 82 when energized thereby.

In some cases, the voltage source 87 may supply an alternating voltage to the circuit, the switches 32 being responsive thereto and so constructed that once they are closed they remain closed until opened manually or under a predetermined condition, such as the beginning of the next pulse from the periodic pulser 88. An advantage of using alternating current, especially at high frequencies (about 20 kc. and higher), is that the gap between each conductive member 21 and the workpiece 17 is directly proportional to the resistance of the electrolyte therebetween. This simplifies any desired control of the magnitude of the current as a function of gap distance. On the other hand, where the resistance to direct current is measured, the relation between the total resistance and the gap between the conductive member 21 and the workpiece 17 is not that of simple proportionality. The resistance to direct current is a more complicated function of the gap distance, and increases as the gap increases. Thus, direct current measurements are less suited than are alternating current measurements to controlling the magnitude of the current as a function of gap distance, but are convenient to use where the current is to be controlled only between the on and off conditions.

Figure 10:
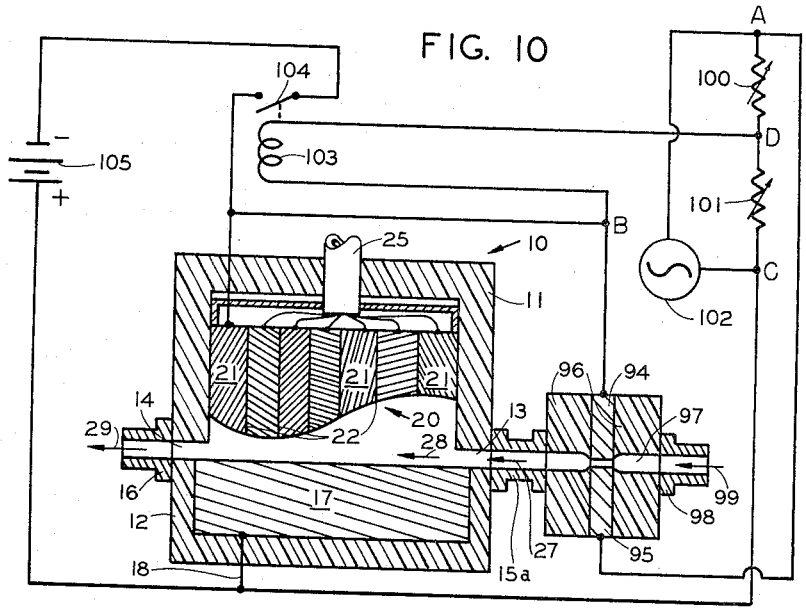
FIG. 10 is a combined elevational section and schematic diagram illustrating apparatus and circuitry useable together in carrying out the invention.

In a method wherein the distance between the workpiece 17 and a given conductive member 21 is measured periodically as a function of the resistance of the electrolyte flowing therebetween, high accuracy may be obtained by using a circuit that includes the resistance of the electrolyte between two conductive surfaces of known area and spacing, to avoid inaccuracies that might otherwise result from variation in the resistivity of the electrolyte. Such a circuit is shown in FIG. 10. The enclosure 10 and apparatus therein are the same as in FIGS. 1 and 2. Standardizing electrodes 94 and 95 are mounted in liquid-tight manner, as shown, in a block 96 of polystyrene or other insulating material. A passage 97 is provided through the block 96 through which electrolyte flows from the inlet connector 98, as is indicated by the arrow 99, to the inlet connector 15a of the enclosure 10, which is adapted to serve also as an outlet connector to the block 96. The electrolyte flows from there, as is indicated by the arrows 27, 28, and 29, through the gap between the tool 20 and the workpiece 17 and on through the outlet 14 and the outlet connector 16.

To avoid any change in the spacing between them, the electrodes 94 and 95 preferably have surfaces of platinum or other conductive material that is resistant to anodic removal with the electrolyte used in the electrolytic removal process in the enclosure 10. The electrodes 94 and 95 are mounted a convenient distance apart, preferably not more than about 30 mils. For simplicity, the gap between the electrodes 94 and 95 may be the same gap that is to be provided between the conductive members 21 and the workpiece 17, and where the conductive members 21 have equal surface areas in contact with the electrolyte, the electrodes 94 and 95 may have the same surface areas. The electrodes 94 and 95 and the electrolyte therebetween form one arm of a Wheatstone bridge circuit between the points B and A, while a conductive member 21, the workpicce 17 and the electrolyte therebetween form another arm of the bridge, between the points B and C. An adjustable resistance 100 comprises the third arm of the bridge, between the points A and D, and another adjustable resistance 101 forms the fourth arm of the bridge between the points D and C. An alternating voltage source 102 is connected across the points A and C. A detection device, shown in FIG. 10 as a solenoid 103, is connected across the points B and D. The solenoid 103, while energized, holds open a normally closed switch 104, which when closed connects the conductive member 21 to the negative terminal of a direct current power source 105, the positive terminal of which is connected by the conductor 18 to the workpiece 17. The switch 104 is constructed such that after being held open by the energized solenoid 103, and closing upon the de-energizing of the solenoid 103, the switch 104 remains closed until it is reset manually or under a predetermined condition and is opened by the solenoid 103.

The resistances 100 and 101 are adjusted such that the bridge is balanced when the conductive member 21 reaches to within the predetermined gap distance from the workpiece 17. As the tool 20 is advanced toward the workpiece 17, the bridge is unbalanced and provides a potential difference between the points B and D that energizes the solenoid 103 causing it to hold the switch 104 in the open position as shown in FIG. 10. When the tool 20 advances to the position where the conductive member 21 reaches to within the desired gap distance from the workpiece 17, the bridge is balanced, there is no potential difference between the points B and D, the solenoid 103 is de-energized, and the switch 104 is released to its normally closed position connecting the power source 105 to the conductive member 21. For convenience, FIG. 10 shows the typical bridge circuit as connected to one conductive member 21 of the tool 20. Each conductive member 21 preferably is connected individually in a predetermined sequence in the bridge circuit, either manually or automatically, along with its own associated solenoid 103 and relay switch 104.

In some cases, as where the surface of the workpiece 17 is fairly rough, it is desirable to control the current connected to a given conductive member in response to a detected value of the distance between the closest points on the conductive member and the workpiece. This can be done using the circuit of FIG. 9 with the switch 86 moved to its upper position connecting the circuit to the voltage source 87. For this purpose the voltage source 87 supplies between the conductive member 21 and the workpiece 17 a voltage sufficient to provide a spark across the predetermined distance through the electrolyte at which it is desired to supply a current through the conductive mmeber 21 for removing material from the workpiece 17 electrolytically. The periodic pulser 88 causes the voltage source 87 to be connected periodically as in the other methods described in connection with FIG. 9. Each adjustable resistance 83 is adjusted so that its solenoid 82 closes the switch 32 only when the current through the current meter 80 and the conductive member 21 is the large current that is drawn when the voltage produces a spark between the conductive member 21 and the workpiece 17. This is a substantially larger current than is obtained by the same voltage across the electrolyte where the closest points on the conductive member 21 and the workpiece 17 are far enough apart to avoid sparking.

The method may be performed manually rather than automatically, if desired. The operator merely reads each current meter 80 and if the current therethrough substantially exceeds the normal range of currents obtained without sparking, this indicates that the voltage from the source 87 has produced a spark between the closest points on the conductive member 21 and the workpiece 17, showing that the distance between the closest points is equal to or less than the predetermined gap distance, and the operator closes the switch 32.

Figure 11:
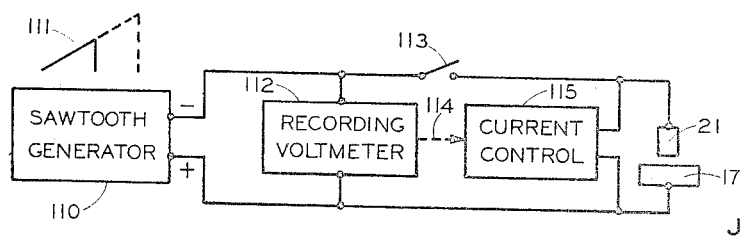
FIG. 11 is a block diagram illustrating typical methods of current control comprising a part of the invention.

Another method for detecting not only whether the closest points are within a predetermined distance, but also what the distance is between the closest points, is illustrated in FIG. 11. A sawtooth generator 110 produces a voltage that periodically increases with time, as is indicated by the wave form at 111. The generator 110 may comprise simply a voltage source, motor driven potentiometer, and overload relay, or other equivalent electronic circuitry, the details of which are not important to the present disclosure. The output of the sawtooth generator 110 is connected to a recording voltmeter 112. When the switch 113 is closed periodically, either by the operator or by a periodic pulser as in FIG. 9, the output of the sawtooth generator 110 is connected between a conductive member 21 and the workpiece 17.

In the absence of a spark between the conductive member 21 and the workpiece 17 the sawtooth generator 110 provides an output voltage increasing from the time the switch 113 is closed to a maximum value as is indicated by the dashed portion of the wave indicated at 111. This maximum voltage is more than sufficient to produce a spark at distances within the range of operation and control desired in the electrochemical machining process. Thus, when the distance between the closest points on the conductive member 21 and the workpiece 17 is within the desired range, a spark is produced before the output of the sawtooth generator 110 reaches the maximum voltage it is capable of producing. When the spark is produced an overload relay or other load responsive means in the circuit of the sawtooth generator 110 causes the output voltage to stop increasing after it reaches an intermediate value (as where the sawtooth generator 110 comprises essentially a capacitor charging circuit) as is indicated in the solid line portion of the wave shown at 111. If the resistance between the sawtooth generator 110 and the conductive member 21 and workpiece 17 is negligible, the voltage drops substantially to zero, as is indicated by the solid line at 111, because of the substantial short circuit resulting from the sparking. Where the resistance is not negligible, however, load responsive means such as an overload relay in the sawtooth generator 110 may be provided to substantially reduce the output voltage, or to disconnect it, when the output current increases substantially because of the sparking between the conductive member 21 and the workpiece 17.

The recording voltmeter 112 indicates the magnitude of the voltage that produced the spark, providing an adjustment as is indicated at 114 of a current control 115 responsive to the magnitude of the voltage that provided the spark. The current control 115 may comprise any suitable servo system for providing the desired currents through the conductive member 21 depending on the distance between the closest points on the conductive member 21 and the workpiece 17 as indictaed by the recording voltmeter 112, the currents through the conductive members 21 being controlled by adjusting the voltages supplied thereto.

One advantage of the spark discharge methods of controlling operation is that they are based on the distance between the closest points on the conductive member and the workpiece and thus provide better protection against sparking, arcing, or shorting in the electholytic removal process than do the methods described earlier, which detect the average distance between the conductive member and the workpiece. Another advantage of the spark discharge methods is that they are independent of the surface area of the conductive member. Thus the conductive members in a tool need not all have the same surface areas and the surface areas need not even be known. The spark discharge methods have the disadvantage that they may produce a small amount of damage to the tool and the workpiece. The sparking voltage should be applied no oftener than is necessary for proper control, in order to limit the damage to negligible amounts. A combination of a spark discharge method with a resistance method of control is desirable in some cases.

An important advantage of all of the methods of controlling the currents to the conductive members of the tool separately is that they provide greater accuracy in shaping than is obtainable with a solid tool or with a tool made of segments that are not insulated one from another. Another important advantage of separate control, even the simplest on and off controls, is that the amount of material that is removed, beyond what is necessary to provide the desired shape, is reduced. As previously stated, in electrochemical machining with a solid tool, material is removed simultaneously not only from the areas containing excess metal, but also (at a slower rate because of the wider gap) from the other areas. To avoid inaccuracy in the finished workpiece, it is generally necessary to make the rough forging or other blank substantially thicker than the desired final product. However, by using a segmented tool as in the present invention, and supplying current at first only to the conductive tool members opposite the areas having the most excess material and controlling the magnitude of the currents to any desired extent during the operation, much better accuracy is obtained and the amount of excess that must be removed is minimized. Thus the machining envelope provided in the blank can be substantially reduced, with consequent saving of materials and machining costs.

Similarly, in sinking a cavity electrochemically as in FIGS. 1 and 2 using a solid tool a substantial amount of material would be removed from the right end of the cavity before the material at the left end had been removed to the desired depth and it would be necessary to penetrate still further before obtaining the proper shape over the entire cavity. Using the segmented tool of FIGS. 1 and 2, the segment at the right end does not receive any current until near the end of the operation and the entire cavity is given the proper shape as in FIG. 2 with only a minimum of penetration beyond the desired depth.

Another advantage flowing from the present invention is the ability to provide protection against substantial damage from short circuits. In electroshaping operations, accidental short circuits occur rather frequently because of inadvertent contact between the cathode tool and the workpiece. With prior methods, where currents of 1,000 to 10,000 amperes are commonly used with a one piece tool, contact between the workpiece and the tool leads to a damaging arc in which a very high current flows across a small area of the electrode. This may result in a large gouge in the tool, destroying its accuracy, and a gouge or a heat damaged area in the workpiece requiring scrapping of an expensive article. In drilling small holes or in other operations where the area and the total current are small, it is possible to provide some protection against damaging arcs by including a ballast resistance in the circuit. For example, in drilling a hole at one ampere and six volts with a three ohm ballast resistance in the circuit, if the electrolysis resistance is six ohms and if this should suddenly disappear because of a short circuit, the current would be limited by the ballast resistance to three amperes, thus minimizing the damage. In a large electroshaping operation using a solid tool, it is impractical to use a ballast resistance and because of the large current supplied any ballast resistor would provide little or no protection. However, with a segmented electrode it is possible to utilize a ballast resistance and to protect large segmented tools quite effectively because the current to each segment is small enough to permit effective ballast resistors to be inserted in each circuit leading to a segment without undue power losses.

The resistances 31 of FIGS. 3 and 9, the resistances 61 and 61' of FIG. 5, and the resistances 66 and 66' of FIG. 6 serve as protective ballast resistances as well as voltage and current adjusting means. Where adjustment is not required, these resistances may be replaced by fixed resistors or the leads connecting the conductive members to the switches or the power source may be chosen of such size and length as to provide the desired ballast resistance.

Figure 12:
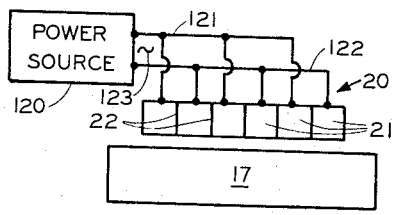
FIGS. 12–15 are electrical diagrams illustrating typical circuitry useable in carrying out the invention.

Another advantage of using a tool comprising a plurality of conductive members and insulating them one from another is brought out in FIG. 12, wherein current is supplied by connecting at least two conductive members 21 to a current source 120, so that current flows from one member 21 so connected, through the electrolyte to the workpiece 17, and thence through the electrolyte to another member 21 so connected; the workpiece 17 thus conducting current in bipolar manner. As is shown in FIG. 12, the first, third, and fifth conductive members 21 are connected by a conductor 121 to one terminal of the power source 120, while the second, fourth, and sixth members 21 are connected by a conductor 122 to the other terminal of the power source 120. As is indicated at 123, the power source 120 typically comprises a low voltage high amperage supply of alternating current, which may be of ordinary commercial frequency, or of direct current that is periodically reversed, so that half of the conductive members 21 are alternately cathodic and anodic while the other half are alternately anodic and cathodic, the upper surface of the workpiece 17 conducting current therebetween in bipolar manner. The surfaces of the conductive members 21 preferably comprise platinum or other conductive material that is resistant to anoidic removal with the electrolyte in use.

Figure 13:
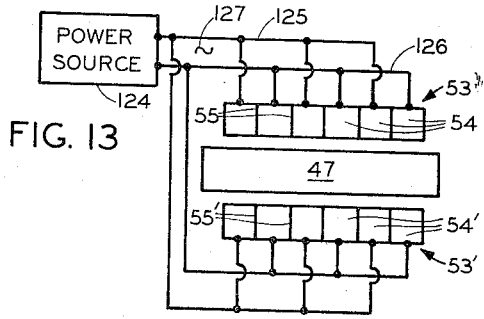

FIG. 13 shows the basic bipolar circuit of FIG. 12 duplicated for use with a pair of tools as in FIG. 4. Alternate conductive members 54 and 54' on each side of the workpiece 47 are connected by a conductor 125 to one terminal of the power source 124, while the other half of the conductive members 54 and 54' are connected by a conductor 126 to the other terminal of the power source 124. As is indicated at 127, the power source 124 typically comprises a supply of alternating current or of periodically reversed direct current. The operation is similar to that described for FIG. 12, and some of the current flows through the workpiece 47 from top to bottom and bottom to top between conductive members 54 and conductive members 54' connected to opposite terminals of the power source 124, as in the circuit of FIG. 6.

Figure 14:
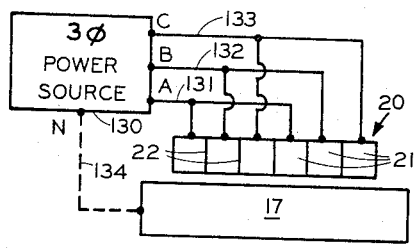

FIG. 14 illustrates a method of bipolar operation similar to that of FIG. 12, wherein the conductive members are connected in at least one group of three to a source of three-phase alternating current, the members of each group being connected respectively to the three individual phase outputs of the source. As is shown in FIG. 14, the first and fourth conductive members 21 of the tool 20 are connected by a conductor 131 to one phase output A of the power source 130, the second and fifth conductive members 21 are connected by a conductor 132 to a second phase output B of the power source 130, while the third and sixth conductive members 21 are connected by a conductor 133 to the third phase output C of the power source 130. The workpiece 17 conducts in bipolar manner in the conductive members 21 and the operation is similar to that of FIG. 12 except that the currents in the conductiive members 21 are 120° out of phase in the circuit of FIG. 14 rather than 180° out of phase as they are in the circuit of FIG. 12. The surfaces of the conductive members 21 preferably comprise platinum or other conductive material that is resistant to anodic removal with the electrolyte in use. Where it is inconvenient to make electrical connection to the workpiece 17, it is preferable to omit the connection indicated by the dashed line 134 from the common terminal N of the three-phase power source 130 to the workpiece 17. Where it is desired to connect to all four terminals of a Y-connected three-phase supply, however, the connection indicated at 134 may be made. With such a connection the surfaces of the conductive members 21 may comprise titanium, tantalum, or other material that provides rectifying action. With such surfaces the circuit of FIG. 14 including the connection 134 provides half wave rectifying action such that the workpiece 17 is always anodic and each conductive member 21 alternates between the cathodic and nonconducting conditions.

Figure 15:
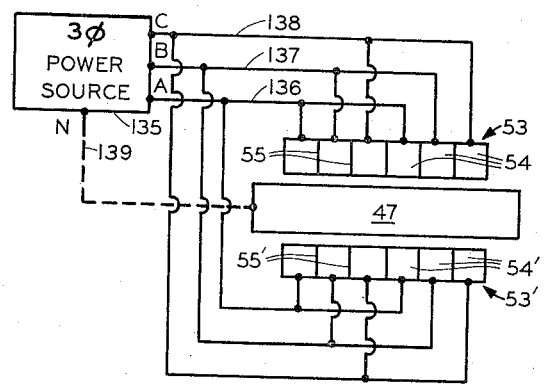

FIG. 15 illustrates a method similar to that of FIG. 14, using two tools as in FIGS. 4 and 13. Conductive members 54 and 54' are connected by conductors 136, 137, and 138 to a three phase power source 135, as shown, to the three individual phase outputs A, B, and C, respectively. Where desired, as for rectifying operations,, the workpiece 47 may be connected to the common terminal N of a four-wire Y-connected supply 135, as is indicated by the dashed line 139. Operation is similar to that of FIG. 14, with some currents passing from top to bottom and from bottom to top of the workpiece 47 between the conductive members 54 and the conductive members 54' also, as in the circuit of FIG. 13. In old methods of operation using a tool comprising a single piece, the workpiece must be connected to the power source, and such methods could not be adapted for bipolar operation as in FIGS. 12 and 14. In prior methods of shaping turbine blades and in other operations employing two tools each comprising a single piece, bipolar operation is possible only with reversed direct current and single-phase alternating current. The present invention permits bipolar operation using three phase alternating current as in FIG. 15.

The circuits of FIGS. 12, 13, 14, and 15 do not require the workpieces to be connected to the power sources. However, except where the dotted line connections shown in FIGS. 14 and 15 are employed, the gaps between the workpieces and the electrodes should be substantially smaller than the thickness of the insulation between the electrode segments. If the gaps between the electrodes and the workpieces are too large with respect to the spacing between the electrode segments most of the current will flow through the electrolyte between segments instead of flowing from a segment to the workpiece and from the workpiece to another segment.

For simplicity, the resistances and switches as shown in FIGS. 3, 5, 6, and 9 are omitted from FIGS. 12 to 15. The various manual and automatic adjustments and current controls as described in connection with other figures of the drawings may be employed in obvious ways in carrying out the methods illustrated in FIGS. 12 to 15.

In operations employing segmented tools according to the present invention conditions may arise, as when voltage is connected to one conductive member and not to an adjacent conductive member, where a conductive member may itself tend to function as a bipolar electrode between an adjacent conductive member and the workpiece. For operations in which such conditions may arise, it is preferable that the active surfaces of the conductive members of the tool comprise a material that is substantially free from anodic electrolytic dissolution in the electrolyte. A preferred material is platinum, since it adequately resists anodic dissolution in the electrolytes commonly used in electrochemical machining processes, such as those containing sulfuric acid, sodium chloride or mixtures thereof, as well as alkaline electrolytes such as sodium hydroxide. Palladium, platinum-base alloys, and palladium-base alloys also have excellent resistance to anodic attack in most electrolytes.

Where any such bipolar action takes place, however, a small amount of material may be removed from the workpiece in the region adjacent to the cathodic areas of the conductive members that are conducting in bipolar fashion. To prevent bipolar action, the active surfaces of the conductive members of the tool may comprise a material that passivates when made anodic in the electrolyte. Titanium, tantalum, and certain titanium-base alloys passivate when made anodic in most of the commonly used electrolytes, such as the widely used sulfuric acid and sodium chloride electrolytes. Nickel passivates when made anodic in alkaline electrolytes, such as sodium hydroxide and potassium hydroxide. Thus to prevent bipolar action the active surfaces of the conductive members of the tool may comprise a material of the group consisting of titanium and tantalum, and where the electrolyte is alkaline the active surfaces may comprise nickel. These materials are less expensive than platinum and can be machined about as easily as stainless steel. They resist the flow of bipolar current, because the anodic areas passivate, protecting both the conductive member of the tool and the workpiece adjacent thereto from undesired anodic dissolution.

Various designs and methods of construction of segmented electrodes may be employed to provide the variety of tool configurations required in electroshaping. The construction depends on the configuration and the accuracy desired as well as economic factors such as the useful life required of the tools in terms of the number of identical workpieces to be produced.

FIGS. 16 and 17 show a tool having a pattern of equal-area square metal segments 145 separated from each other by suitable insulation 146. As discussed previously, each segment may be part of a separate parallel electrical circuit with means for gap sensing and voltage control. The electrode of FIGS. 16 and 17 can be used for sinking a cavity of rectangular shape with a flat bottom. It can be used also for electroshaping to produce a flat surface on an initially irregular workpiece.

FIG. 18 shows a tool having a pattern of equal-area round segments 147 separated from each other by insulation 148. Round segments are sometimes preferred rather than square segments because of their ready availability in the form of wire or rod. The round segments can have any diameter from about 0.001 inch to a half inch or larger. For example, the wire diameter might be 0.004 inch, separated by 0.001 inch of insulation at the closest points. Where the segment diameter is ⅛ inch, with a 0.001 coating of insulation there would be about 64 to 70 segments per square inch.

Where the shape to be provided in the workpiece has a uniform cross section, the conductive members of the tool may conveniently comprise laminations located in planes perpendicular to the plane of the uniform cross section. FIGS. 19 and 20 illustrate a tool of this type in which the segments are oblong rectangles 149 separated by insulation 150. Such a tool is simple to construct, and the technology of making laminated transformer cores can be utilized in making it.

FIG. 16 also illustrates a stage in the construction of a tool electrode with a contoured surface. The desired contour for the working face of the electrode can be formed of any of the conventional machining techniques such as milling and grinding. Generally it is convenient to use a model of the shape to be produced to guide the cutting head during machining.

According to the present invention, where segmented electrodes are used with gap sensing and voltage control, the final gap is a preselected known value. Where desired, the equilibrium gap and the final gap may be the same, since means are provided to control the gap during electroshaping. Ordinarily the configuration allows selection of a constant value over the entire surface for the equilibrium gap and the final gap. In the present invention, the prior knowledge of the final gap greatly simplifies the initial design of a contoured tool electrode, which when once prepared is the final tool electrode and turns out identical finished products regardless of the initial contours of the workpiece. In most cases, there is no need for any subsequent machining of the tool electrode by trial and error methods, and the over-all result is greater accuracy of reproduction of the desired form in the workpiece in repeated operations.

The tool may be shaped electrolytically as is illustrated in FIG. 21. The circuit is similar to that of FIG. 3, but with the connections to the power source reversed. A conductive shaping member 152 is connected to the negative terminal of a direct current source 153, the positive terminal of which is connected through separate swtiches 154 to the individual conductive members 155 of the tool-to-be 156. The conductive members 155 are insulated one from another by insulating spacers 157. The voltages to the individual conductive members 155 and the currents thereto may be controlled by any of the methods described herein, as desired, depending on the accuracy required. The operation is the same as in the methods of this invention using cathodes comprising a plurality of conductive members insulated one from another, except that in the present operation the direction of the current is reversed. The shaping member 152 has the same shape as is to be provided by the tool 156 later when used as the cathode in electroshaping workpieces.

A further consideration in the electroshaping of segmented tool electrodes is provision for removing the insulation between segments that is exposed as a result of the anodic dissolution of part of the segment. With some insulating materials there is no problem, because the exposed unsupported insulation is rapidly eroded by the high velocity electrolyte flow, while the supported insulation not extending beyond the electrode in the final tool electrode is protected from the erosive action of the electrolyte. For more erosion resistant insulation materials, an abrasive may be added to the electrolyte to speed up the erosive action.

Undercutting of the insulation below the contoured surface of the tool electrode does not interfere with the opertaion of the segmented electrode. The purpose of the insulation is to prevent physical contact and electronic conduction between adjacent segments. The initial construction of the electrode may provide nonconducting spacers 157 only at the top of the electrode away from the contoured end, as in FIG. 21, to maintain each of the segments out of physical contact with adjacent segments. Such an initial construction simplifies electroshaping of segmented tool electrodes, since there is no exposed insulation to remove. After electroshaping the tool electrode, the space between segments can be filled with insulating material if desired.

Ordinarily in tools having many segments it is preferred that the segments all have known surface areas, to simplify the gap sensing and voltage control circuitry. However, it is not necessary that the segments have equal surface areas, equal across sectional areas, or even similar configurations. FIGS. 22 and 23 show a segmented tool in which the segments are made to conform to particular distinctive shapes in portions of the tool. The tool 160 has four segments 161, 162, 163, and 164, insulated from each other as is indicated at 165. The segment 161 completely surrounds the other three segments 162, 163, and 164, which may be concave, convex, rectangular, or any convenient shape according to the configuration to be provided in the workpiece 166. The advantage of the particular segmenting shown is evident in that the segment 162 can be used to partially form the desired configuration before voltage is applied to the segments 163, 161, and 164, in that order, as the cavity is sunk in the workpiece 166.

One or more of the segments 161–164 could of course be further divided into a plurality of segments if desired. The feature brought out in FIGS. 22 and 23 is that of providing a segmented tool wherein at least some of the boundaries between adjacent conductive members are located at positions of significant change in the shape to be provided in the workpiece.

FIGS. 24 and 25 illustrate a method of preparing an electrode of the type shown in FIG. 18. The method comprises the steps of tightly winding insulated wire around a cylindrical form in a plurality of contiguous layers, fastening the wound layers in fixed relation to a plane substantially parallel to the axis of the form, cutting through the layers in the plane, bending the resulting bundle of wires outwardly from the axis to provide space for access to the cut ends of the wires, the bundle of wires forming an electrode comprising a plurality of conductive members insulated one from another, one surface formed by the ends of the wires providing a conductive surface suitable for use in electrolytic processes when current is supplied thereto by connections to the other ends of the wires. The method is particularly useful for making electrodes having large numbers of segments per unit area.

Referring to FIG. 24, an insulated wire 170, say about 0.004 inch in diameter and coated with insulation 171 about 0.005 inch thick, is wound on a cylindrical core 172 having a circumference at least equal to the desired length of the segments. The width of the core 172 is at least equal to the longest dimension of the tool electrode to be made, and the wire 170 is wound around the core 172 until a thickness is built up at least equal to the other dimension of the electrode. Conventional wire winding equipment can be used to provide a tightly wound coil with the insulation of adjacent portions of the wire 170 touching in the first layer. The second layer is wound so that each portion of the wire 170 lies in the valley formed by the two adjacent portions in the layer below, and so on with subsequent layers. After the coil is completely wound, a portion of it is held in place in any suitable manner, as by hermetically sealing it in plastic or by tightly fastening it in a metal sheath (not shown). With the coil fixedly held together, the rigidly held portion of coil is cut, as by sawing, in a radial plane through the axis of the cylindrical core 172.

The resulting bundle of wires is then straightened out, one end thereof being held rigidly together to maintain the plane surface formed by the ends of the wires, and the other ends of the wires being permitted to move relative to one another, since the outer wires are longer than the inner ones. The plane surface formed at the end 173 in FIG. 25 may be used in electrolytic removal processes when current is supplied thereto by connection to the other ends of the wires as indicated at 174. Where the electrode is to be used to provide a shape other than a plane, material may be removed from the end 173, as is indicated by the dashed line 175, to provide the desired surface shape.

Figure 26:
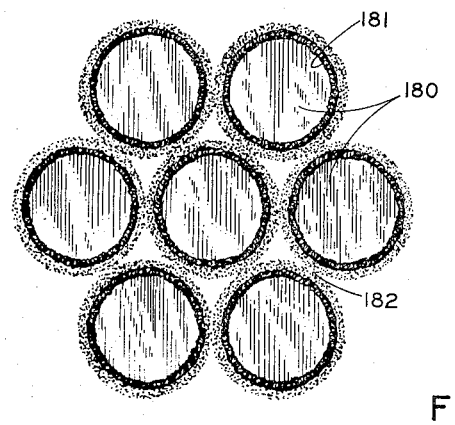
FIGS. 26 and 27 are end views illustrating a method of preparing electrodes according to the invention.
Figure 27:
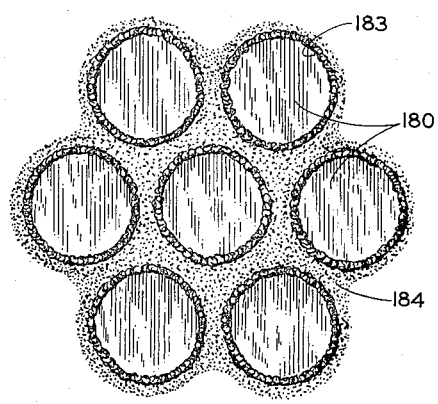

FIGS. 26 and 27 illustrate another method of preparing an electrode of the type shown in FIG. 18. The method comprises the steps of coating, with a conductive metal (such as aluminum) that has an insulating oxide, the sides of a plurality of conductive members over a substantial area of each beginning adjacent to one end, further coating each area with a conductive metal oxide (such as lead dioxide), assembling and retaining the conductive members in a bundle with said one ends forming a surface and with the coated areas of adjacent members in contact with each other, electroshaping the surface with the bundle connected as an anode in an electrolyte capable of anodically removing the materials of the members and the coatings thereon, heating the bundle to a temperature sufficient to diffuse oxygen from the outer coatings into the inner coatings to form a layer of said electrically insulating oxide around each conductive member and to cause the outer coatings of the members to adhere to each other, the surface being suitable for use in electrolytic processes when current is supplied thereto by connections to the other ends of the conductive members.

Referring to FIG. 26, each segment may be made of a steel wire 180 provided with a thin electrodeposit of aluminum 181 of about 0.0005 inch thickness followed by an electrodeposit of lead dioxide 182 of about 0.001 inch thickness. The wires 180 are assembled and held together as in FIG. 26. The bundle is connected as an anode and is electroshaped to the desired configuration using a model as in FIG. 21. A mixture of acids or other suitable electrolyte is used that anodically removes metal from steel, aluminum, and lead dioxide, all of which are electrical conductors. After the electrode is shaped, it is heated to a temperature at which the oxygen in the lead dioxide diffuses into the aluminum layer 181 forming a layer of aluminum oxide 183 (see FIG. 27), which is a nonconductor and insulates each segment 180 from the others. A wider range of temperatures may be used, the reaction taking place faster at higher temperatures. The materials should, however, be kept below their melting points. The lead dioxide by loss of oxygen is partially converted to lead oxide 184 (FIG. 27), which has low conductivity compared to lead dioxide but is not as good an insulator as aluminum oxide. The lead oxide principally serves to cement the insulated segments together to form a compact electrode. The surface of the electrode is polished smooth and an electrodeposit of platinum is applied to the steel segments 180. The platinum does not deposit on the aluminum oxide 183 or the lead oxide 184, as they are essentially nonconducting relative to the steel 180.

Figure 28:
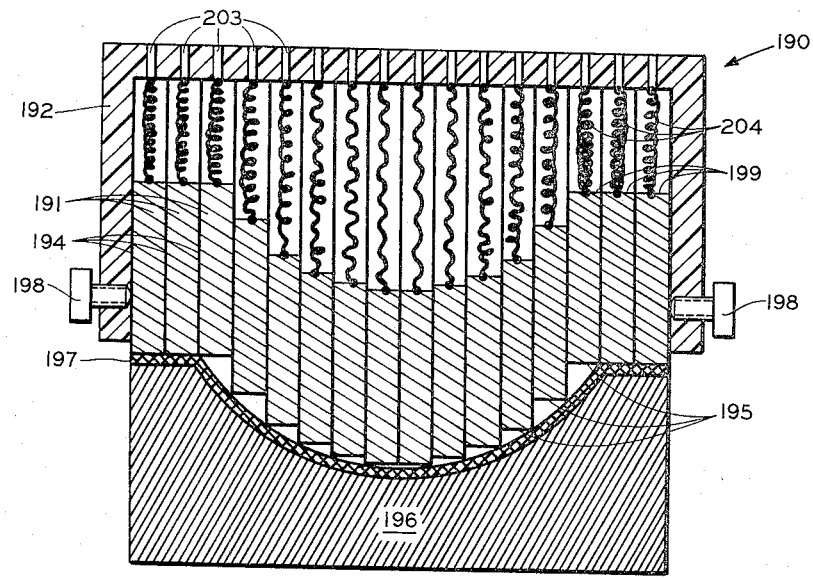
FIG. 28 is an elevational section, somewhat diagrammatic, of apparatus useable in carrying out the invention.
Figure 29:
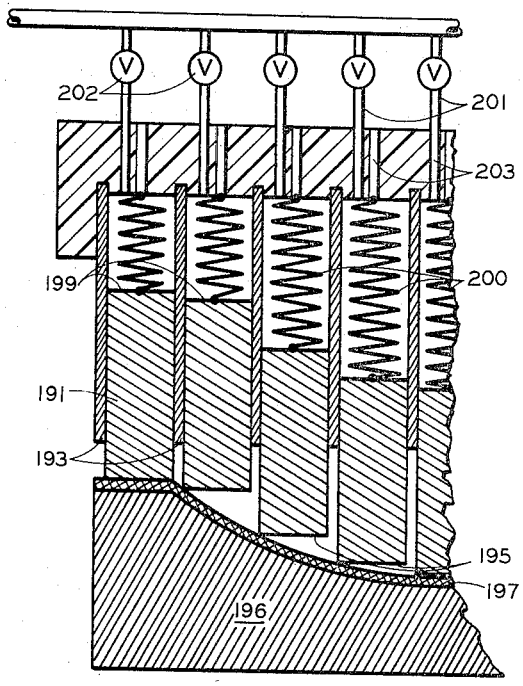
FIG. 29 is a view similar to FIG. 28 showing a portion of a modified form of the apparatus of FIG. 28.

FIGS. 28 and 29 show a versatile tool electrode of the type shown in several other figures, but having the advantage that it can be varied to provide different shapes.

A method of preparing such an electrode comprises the steps of assembling a plurality of elongated conductive members in closely adjacent parallel side-by-side arrangement, insulated one from another, and movable relative to one another in a lengthwise direction, adjusting the relative lengthwise positions of the assembled members to form by adjacent ends thereof approximately a desired surface shape, and fastening the members in said relative positions, the approximate surface formed by said adjacent ends being suitable for use in electrolytic processes when current is supplied thereto by connections to the other ends of the conductive members. Typically the relative lengthwise positions are determined by placing said adjacent ends against a surface having substantially the desired shape. Where maximum accuracy of reproduction and smoothness are desired, material is removed from the approximate surface formed by said adjacent ends to provide the desired surface shape therein, as by electroshaping the approximate surface to the desired surface shape with the conductive members connected as anodes.

The conductive members preferably are fastened in their relative positions in a temporary manner such that they can later be unfastened and moved to different relative positions. The fastening may be done by clamping the members in their relative positions or by pressing each member tightly against a material so located as to limit the position of the end of the member opposite the end that forms a part of the approximate surface, as by resilient means pressing each member tightly against a confined substantially incompressible fluid.

An electrode 190 of variable shape as in FIGS. 28 and 29 may include a plurality of elongated conductive members 191, means such as the housing 192 and the compartments 193 for holding them in closely adjacent parallel side-by-side arrangement, insulated one from another (indicated at 194 in FIG. 28), and movable relative to one another in a lengthwise direction, means for adjusting the relative lengthwise positions of the members 191 to form by adjacent ends 195 thereof approximately a desired surface shape, means for fastening the members 191 in their relative positions, and means for making electrical connection to the ends of the conductive members that are opposite the ends forming the approximate surface shape. In FIG. 29 the holding means comprises a plurality of adjacent compartments 193, one for each conductive member 191, comprising insulating material, such as polytetrafluoroethylene, fitting snugly but slidably around the members 191.

Polytetrafluoroethylene, commonly called "Teflon" (TM), is a suitable insulating material with a very low coefficient of friction. It is also quite resistant to attack from the normal electrolytes used in electroshaping. It is a preferred material not only for the compartments 193 in FIG. 29, but also for the insulation 194 on the conductive members 191 in FIG. 28. For example, titanium segments are accurately ground with ±0.0001 inch accuracy to a good finish of less than 5 microinch r.m.s. and then spray coated with polytetrafluoroethylene to a uniform thickness of 0.0005 inch ±0.0001 inch. The insulation of the segments is then lapped to optical flatness. This procedure insures a sliding fit of the individual segments and also provides an accurately known cross sectional area for each segment.

The adjusting means comprises means for placing the adjacent ends 195 against a surface having substantially the desired shape, as by manual pressure or by gravity in FIG. 28, or by hydraulic pressure in FIG. 29. The model of the desired product 196 may be provided with a layer of material 197 of thickness equal to the final gap. The conductive members 191 are pressed against the spacer 197 on the model 196 so that the surface formed by the lower ends 195 approximates the contour of the electrochemical negative of the model 196. When the clamps 198 are tightened, the ends 195 maintain the desired contour.

The compartments 193 in FIG. 29 preferably extend beyond the opposite upper ends 199 of the conductive members 191, and the adjusting means comprises resilient means such as the springs 200 for urging the members 191 in the lengthwise direction away from the adjacent lower ends 195 and means such as the tubing 201 for providing adjustable quantities of substantially incompressible fluid in the compartments 193 beyond the opposite upper ends 199 of the members 191 to limit the positions of the opposite ends 199. The resilient urging means 200 and the fluid providing means 201 may function also as components of the fastening means in combination with means such as the valves 202 for maintaining substantially constant the quantities of fluid in the compartments 193.

The resilient means may comprise a plurality of conductive springs 200 in electrical as well as mechanical contact with the conductive members 191, one spring 200 for each member 191, the springs 200 functioning also as components of the electrical connection means in combination with a plurality of contacts 203 electrically connected one to each spring 200. The contacts 203 may conveniently have the form of jacks, as shown, for receiving plug connections from wires leading to a control circuit. In FIG. 28, flexible wires 204 are connected between the contacts 203 and the upper ends 199 of the conductive members 191.

The fastening means includes means for unfastening the members 191 from their relative positions when desired, as by loosening the clamping screws 198 in FIG. 28, and by opening the valves 202 in FIG. 29, permitting readjustment to different relative lengthwise positions of the conductive members 191 and fastening at the different positions.

The ends 195 of the conductive members 191 do not precisely duplicate a smooth curved contour but rather approximate the curved surface in a stepwise fashion. The size of each step is related to the width of the member 191 and the angular curvature of the part 196 relative to the axis of the conductive member 191. For large segments 191, the steps may be removed by subsequent machining. The method of approximating the contour with movable segments reduces the amount of machining to a practical minimum. In some cases the steps are not objectionable, as where the contours are shallow and the conductive segments are small. In such cases, the steps need not be machined off. When the segments are clamped in position, the tool electrode is ready for use in electroshaping. Since the wear on the tool in electroshaping is negligible, it can be reused in different configurations by repeating the process of pressing the segments against a new model and clamping them in position.

The versatile electrode of FIG. 29 is particularly useful for blade shaping with two opposing tool electrodes as in FIG. 4. In setting up for a job, an accurate model of the turbine blade, including the envelope corresponding to the final gap, is placed in the fixture between the two tool electrodes. The electrode segments are then hydraulically forced against the model and fastened in position. By forming the electrodes in relation to the fixturing that holds the blade, any inaccuracies in the blade holding fixture are automatically taken into account and compensated for. At the time of forming the tool electrodes, limit switches are set to stop the advance of the tools at precisely the right locations. Thus, when the model is removed and a rough forging is inserted and electroshaped, the final part is an accurate duplication of the model.

Figure 31:
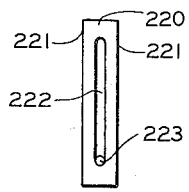
FIG. 31 is an enlarged side view showing a detail of the apparatus of FIG. 30.
Figure 30:
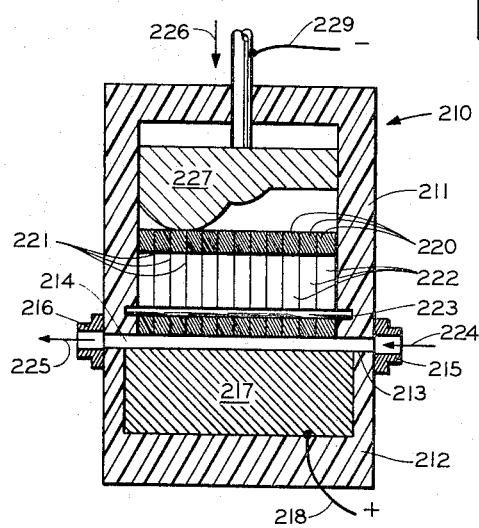
FIG. 30 is an elevational section, somewhat diagrammatic, of electrolytic removal apparatus according to the present invention at the beginning of an operation.
Figure 32:
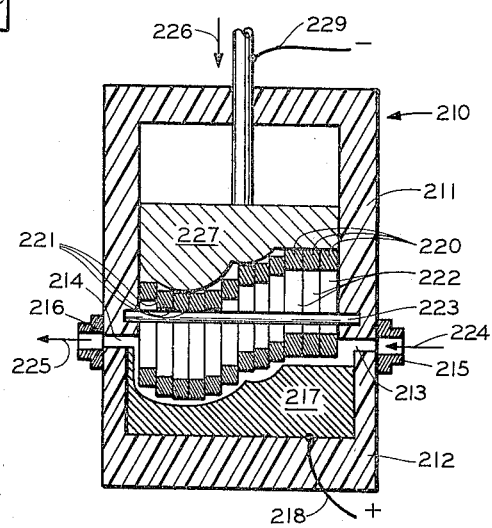
FIG. 32 is a view similar to FIG. 30 showing the apparatus in a later stage of the electrolytic removal operation.

FIGS. 30–32 illustrate methods and apparatus according to the present invention wherein the positions of the conductive members of the tool are separately controllable, and preferably are controlled in accordance with a predetermined program determined according to the depth of material to be removed from the workpiece opposite each conductive member.

It is preferred that the conductive members be initially positioned approximately equidistant from the surface of the workpiece. Each conductive member is advanced toward the workpiece, the member opposite which the greatest depth of material is to be removed from the workpiece beginning its advance first, the member opposite which the next greatest depth of material is to be removed beginning its advance next, and so on, at predetermined positions of the members already advancing. The gaps between the conductive members and the workpiece preferably are maintained approximately equal over the surface of the workpiece as the members are advanced and material is removed from the workpiece. The currents to the conductive members preferably are separately controlled in accordance with the principles disclosed herein, using the appropriate circuits disclosed or obvious modifications thereof. Ordinarily, current is connected to each conductive member as it begins its advance toward the workpiece.

For shaping a single surface, as in making dies and other cavities, the apparatus of FIGS. 30–32 may be used. For shaping a plurality of surfaces at the same time, the apparatus is merely duplicated for each surface, as the apparatus of FIGS. 1 and 2 is duplicated in FIG. 4. Referring to FIGS. 30 and 32, an enclosure box 210 comprises an upper portion 211 and a lower portion 212 fastened together in liquidtight manner but providing an inlet opening 213 and an outlet passage 214 for electrolyte. The enclosure portions 211 and 212 preferably are made of a strong plastic such as polystyrene or other suitable insulating material. An inlet connector 215 and an outlet connector 216 are provided for convenience in connecting the inlet 213 and the outlet 214 to hoses or other conduits conveying electrolyte to and from the enclosure 210.

Fixedly held in the lower portion 212 is a workpiece 217 to which electrical connection is made by a conductor 218. Snugly fitting in the upper portion 211, but separately slidable therein vertically, are a plurality of conductive members 200, which are insulated one from another as is indicated at 221. The insulation 221 preferably comprises a coating on each conductive member 21 made of polytetrafluoroethylene (Teflon), which has a very low coefficient of friction and high resistance to attack from most electrolytes and other materials. Each conductive member 220 is provided with a slot 222 (see also FIG. 31). A rod 223 fixedly held in the upper portion 211 of the enclosure box 210 passes through the slots 222 in the conductive members 220 to limit the extreme positions between which the conductive members 220 may be moved.

Electrolyte is supplied under pressure to the connector 215 and the inlet 213, as is indicated by the horizontal arrow 224. The electrolyte fills the space between the workpiece 217 and the conductive members 220 and continues to flow horizontally to the outlet 214 and on through the connector 216, as is indicated by the horizontal arrow 225. The pressure of the electrolyte exerts an upward force on the conductive members 220 and holds them in their upper extreme position, as shown in FIG. 30, in the absence of a greater downward force. The electrolyte may be supplied to the enclosure 210 by any convenient means, conventional or otherwise, such as the usual sump and pump of the Faust and Gurklis patent.

Above the conductive members 220 and snugly fitting in the upper portion 211, but vertically slidable therein, as indicated by the arrow 226, is a cam 227 having substantially the negative of the shape to be provided in the workpiece 217 (the cam 227 could be an old single-piece tool that had been used for providing the same shape by the well-known prior methods of electrochemical machining). Fixedly attached to the cam 227 is an advancing rod 228. The cam 227 and the advancing rod 228 are made of conductive material. A conductor 229 is connected to the cam advancing rod 228 for supplying current through the rod 228 and the cam 227 to the conductive members 220 when they make contact with the cam 227.

At the beginning of the electroshaping operation, with the conductive members 220 in their initial positions as shown in FIG. 30, current is connected only to the conductive member 220 in contact with the lowermost portion of the cam 227. As the cam 227 advances downwardly, it contacts more and more of the conductive members 220 until finally current is connected to all of them as the operation nears completion, as shown in FIG. 32. The movement of the cam advancing rod 228 may be controlled by any convenient means, conventional or otherwise, such as the common lathe type feeding apparatus of the Faust and Gurklis patent.

The apparatus of FIGS. 30–32 comprise a typical simple form of apparatus according to the present invention for electrolytically removing material from the surface of a workpiece. The apparatus comprises a plurality of closely adjacent conductive members 220 insulated one from another with their lower adjacent ends defining approximately a predetermiend surface. The lower portion 212 of the enclosure 210 provides means for holding the surface of the workpiece 217 in juxtaposition to, but out of contact with, the lower adjacent ends of the conductive members 220. The connectors 215 and 216 are provided for supplying an electrolyte between the surface of the workpiece 217 and the lower adjacent ends of the conductive members 220. The cam 227 is shaped to control the positions of the conductive members 220 relative to the workpiece separately in accordance with a program that is determined according to the depth of material to be removed from the workpiece 217 opposite each conductive member 220. The conductor 218, the conductor 229, the advancing rod 228, and the cam 227 supply current through the workpiece 17, the electrolyte, and at least one conductive member 220.

The upper portion 211 of the enclosure 210 and the rod 223 initially position the conductive members 220 with their lower adjacent ends approximately equidistant from the surface of the workpiece 217. In FIG. 30, the surface of the workpiece 217 is a plane and the lower adjacent ends of the conductive members 220 initially define substantially a plane surface. Where the initial surface of the workpiece is not a plane, as in the shaping of turbine blades, the rod 223 may be shaped accordingly. The cam 227 is shaped such that in advancing each conductive member 220 toward the workpiece 217, the cam 227 begins first the advance of the member 220 opposite which the greatest depth of material is to be removed from the workpiece 217. It begins next the advance of the conductive member 220 opposite which the next greatest depth of material is to be removed, and so on, at predetermined positions of the members already advancing. Material is electrilytically removed from the workpiece 217 below the advancing conductive members 220 at the same rate at which they are advanced, and thus the gaps between the conductive members 220 and the workpiece 217 are maintained approximately equal over the surface of the workpiece 217. The current to each conductive member 220 is separately controlled, current being connected by the cam 227 to each conductive member 220 as the member 220 begins its advance toward the workpiece 17.

The apparatus of FIGS. 30–32 may be modified in obvious ways to provide separate control over the magnitude of the currents in the conductive members 220, protection by ballast resistances, bipolar connections, operation from three-phase alternating current, and various other features disclosed herein. More complicated means may, of course, be used for advancing the conductive members 220 separately. Using well-known automation equipment and techniques, the conductive members 220 can be advanced in any desired manner to provide any desired shape within the limits of the size of the apparatus. Thus, by providing a separately controlled power drive for each conductive member 220, the apparatus can be operated automatically to provide a predetermined number of workpieces with a desired first shape, then a predetermined number of workpieces with a desired second shape, and so on. Such a piece of equipment may appropriately be called a universal electrolytical removal machine.

Various combinations of features of the invention disclosed in the drawings or in this description and not specifically mentioned in combination herein, as well as other obvious modifications of the present teachings may, of course be made without departing from the spirit and scope of the invention and without the exercise of further invention. No attempt is here made to exhaust such possibilities.

What is claimed is:

1. A method of electrolytically removing material from the surface of a workpiece comprising the steps of placing such surface in juxtaposition to but out of contact with an electrode tool comprising a plurality of conductive members insulated one from another and together providing a three-dimensional surface that is substantially complementary to a three-dimensional surface contour to be produced in the workpiece, supplying an electrolyte between the juxtaposed surfaces of the tool and the workpiece, advancing the juxtaposed surfaces relatively toward each other, and supplying current through the workpiece, the electrolyte, and the tool, the currents supplied to each of the conductive members of the tool being separately initiated with the current being supplied first to the member opposite which the greatest depth of material is to be removed from the workpiece, the current being supplied next to the member opposite which the next greatest depth of material is to be removed, and so on.

2. A method according to claim 1 wherein current is connected to each said conductive member of the tool when its surface reaches to within a predetermined distance from the juxtaposed surface of the workpiece.

3. A method according to claim 1 including the step of controlling the currents to said conductive members of the tool in accordance with a predetermined program.

4. A method according to claim 1 wherein said currents are controlled in accordance with the relative positions of said tool and said workpiece.

5. A method according to claim 1 wherein said juxtaposed surfaces are advanced toward each other at a uniform rate and said currents are controlled in accordance with the time during which said surfaces have been so advanced.

6. A method according to claim 2 including the steps of detecting the distances between the several conductive members and the juxtaposed surface of the workpiece.

7. A method according to claim 6 wherein the distances between the workpiece and the individual conductive members are detected as a function of the resistance of the electrolyte therebetween.

8. A method according to claim 6 wherein the distance between conductive members and the workpiece is tested by supplying between said conductive members and the workpiece a voltage sufficient to provide a spark across a predetermined distance through the electrolyte, and detecting whether said voltage produces a spark.

9. A method according to claim 1 including the step of separately controlling the positions of said conductive members of the tool with respect to the workpiece.

10. A method according to claim 9 wherein the positions of said conductive members of the tool are controlled in accordance with a predetermined program.

11. A method according to claim 9 wherein said conductive members are initially positioned approximately equidistant from the surface of the workpiece, and each conductive member is advanced toward the workpiece; the member opposite which the greatest depth of material is to be removed from the workpiece beginning its advance first, the member opposite which the next greatest depth of material is to be removed beginning its advance next, and so on, at predetermined positions of the members already advancing.

12. A method according to claim 11 wherein the gaps between the conductive members and the workpiece are maintained approximately equal over the surface of the workpiece as the members are advanced and material is removed from the workpiece.

13. A method according to claim 11 wherein current is connected to each said conductive member as it begins its advance toward the workpiece.

14. Apparatus for electrolytically removing material from the surface of a workpiece to provide a desired three-dimensional contour therein comprising: a plurality of closely adjacent conductive members insulated one from another, said conductive members defining a predetermined tool surface substantially complementary to the desired three-dimensional contour to be provided in a workpiece; means for holding the surface of the workpiece in juxtaposition to but out of contact with said tool surface defined by said conductive members; means for supplying an electrolyte between the surface of the workpiece and said tool surface; means for controlling the positions of the conductive members relative to the workpiece; means for supplying current through the workpiece, the electrolyte, and said conductive members, and means for separately initiating and controlling the currents supplied to the conductive members, the current being supplied first to the member opposite which the greatest depth of material is to be removed from the workpiece, the current being supplied next to the member opposite which the next greatest depth of material is to be removed, and so on.

15. Apparatus according to claim 14 including separate ballast resistors, one in circuit with each of said conductive members, whereby said juxtaposed surfaces are protected from severe damage by arcing.

16. Apparatus according to claim 14 in which the conductive members are secured immovably together and means are provided for advancing the assembly of conductive members and the workpiece surface toward each other.

17. Apparatus according to claim 14 wherein the means for controlling the positions of the conductive members comprises means for separately controlling the positions of the individual conductive members relative to the workpiece.

18. Apparatus according to claim 14 including means for initially positioning said conductive members with the adjacent surfaces thereof approximately equidistant from the surface of the workpiece.

19. Apparatus according to claim 14 wherein said position controlling means comprises means for advancing each conductive member toward the workpiece, beginning first the advance of the member opposite which the greatest depth of material is to be removed from the workpiece, beginning next the advance of the member opposite which the next greatest depth of material is to be removed, and so on, at predetermined positions of the members already advancing.

20. Apparatus according to claim 14 wherein said position controlling means maintains the gaps between the conductive members and the workpiece approximately equal over the surface of the workpiece as the members are advanced and material is removed from the workpiece.

21. Apparatus according to claim 20 including means for connecting current to each said conductive member as the member begins its advance toward the workpiece.

22. Apparatus according to claim 14 wherein said conductive members are connected in at least one group of three to a source of three-phase alternating current, the members of each said group being connected respectively to the three individual phase outputs of said source.

23. Apparatus according to claim 14 wherein the active surfaces of said conductive members of the tool comprise a material that passivates when made anodic in said electrolyte.

24. Apparatus according to claim 14 wherein each said conductive member has a square cross-sectional surface in contact with the electrolyte.

25. Apparatus according to claim 14 wherein each said conductive member has a circular cross-sectional surface in contact with the electrolyte.

26. Apparatus according to claim 14 wherein the shape to be provided in the workpiece has a uniform cross section, and said conductive members of the tool comprise laminations located in planes perpendicular to the plane of the uniform cross section.

27. Apparatus according to claim 14 wherein at least some of the boundaries between adjacent said conductive members of the tool are located at positions of salient change in the shape to be provided in the workpiece.

28. Apparatus according to claim 14 comprising a plurality of elongated conductive members, means for holding said conductive members in closely adjacent parallel side-by-side arrangement, and movable relative to one another in a lengthwise direction, means for adjusting the relative lengthwise positions of said members to form by adjacent ends thereof approximately a desired surface shape, means for fastening said members in said relative positions, and means for making separate electrical connections to the ends of said conductive members that are opposite the ends forming the approximate surface shape.

29. Apparatus according to claim 28 wherein said holding means comprises a plurality of adjacent compartments, one for each said conductive member, comprising insulating material fitting snugly but slidably around said members.

30. Apparatus according to claim 29 wherein said compartments extend beyond said opposite ends of said conductive members, and said adjusting means comprises resilient means for urging said members in the lengthwise direction away from said adjacent ends and means for providing adjustable quantities of substantially incompressible fluid in said compartments beyond said opposite ends of said members to limit the positions of said opposite ends.

31. A method of preparing an electrode comprising the steps of tightly winding insulated wire around a cylindrical form in a plurality of contiguous layers, fastening the wound layers in fixed relation to a plane substantially parallel to the axis of said form, cutting through said layers in said plane, bending the resulting bundles of wires outwardly from the axis to provide space for access to the cut ends of the wires, the bundle of wires forming an electrode comprising a plurality of conductive members insulated one from another, and removing material from one surface formed by the ends of the wires to provide a conductive surface having a desired surface shape for use in electrolytic processes when current is supplied thereto by connections to the other ends of the wires.

32. A method of preparing an electrode comprising the steps of assembling a plurality of elongated insulated conductive members in closely adjacent parallel side-by-side arrangement, insulated one from another, and movable relative to one another in a lengthwise direction, adjusting the relative lengthwise positions of the assembled members to form by adjacent ends thereof approximately a desired surface shape, fastening said members in said relative positions, and electroshaping the adjacent ends to provide a desired surface shape, the members being connected as anodes, the surface formed by said adjacent ends being suitable for use as a cathode tool in electrolytic processes when current is supplied thereto by connections to the other ends of said conductive members.

33. A method of preparing an electrode comprising the steps of assembling a plurality of elongated conductive insulated members in closely adjacent parallel side-by-side arrangement, insulated one from another and movable relative to one another in a lengthwise direction, adjusting the relative lengthwise positions of the assembled members to form by adjacent ends thereof approximately a desired surface shape, and fastening said members in said relative positions by resilient means pressing each member tightly against a confined substantially incompressible fluid so located as to limit the position of the end of said member opposite the end that forms a part of said approximate surface, the surface formed by said adjacent ends being suitable for use as a cathode tool in electrolytic processes when current is supplied thereto by connections to the other ends of said conductive members.

34. A method of preparing an electrode comprising the steps of coating with aluminum the sides of a plurality of conductive members over a substantial area of each beginning adjacent to one end, further coating each said area with lead dioxide, assembling and retaining said conductive members in a bundle with said one ends forming a surface and with the coated areas of adjacent members in contact with each other, electroshaping said surface with said bundle connected as an anode in an electrolyte capable of anodically removing the materials of said members and the coatings thereon, heating said bundle to a temperature sufficient to diffuse oxygen from the outer coatings into the inner coatings to form a layer of aluminum oxide around each said conductive member and to cause the outer coatings of said members to adhere to each other, said surface being suitable for use in electrolytic processes when current is supplied thereto by connections to the other ends of said conductive members.

References Cited

UNITED STATES PATENTS

| | | | |
|---|---|---|---|
| 2,826,540 | 3/1958 | Keeleric | 204—143 |
| 2,909,641 | 10/1959 | Kucyn | 219—69 |
| 3,228,863 | 1/1966 | Wanttaja et al. | 204—143 |
| 3,271,281 | 9/1966 | Brown et al. | 204—143 |
| 1,647,737 | 11/1927 | Legg | 148—6 |
| 1,904,418 | 4/1933 | Dantsizen | 174—113 |
| 2,276,644 | 3/1942 | Blankenbuehler | 314—69 |
| 2,364,645 | 12/1944 | Mott et al. | 314—69 |
| 2,486,985 | 11/1949 | Ruderfer | 204—224 |
| 2,518,580 | 8/1950 | Trofimov | 314—69 |
| 2,619,438 | 11/1952 | Varian et al. | 148—4 |
| 2,764,543 | 9/1950 | Comstock et al. | 204—143 |
| 2,783,411 | 2/1957 | Matulaitis | 314—69 |
| 2,868,705 | 1/1959 | Baier et al. | 204—224 |
| 2,957,065 | 10/1960 | Bundegaard et al. | 219—19 |
| 2,979,639 | 4/1961 | Williams et al. | 315—127 |
| 2,996,638 | 8/1961 | Webb | 314—61 |
| 3,041,265 | 6/1962 | Williams | 204—143 |
| 3,058,895 | 10/1962 | Williams | 204—143 |
| 3,095,364 | 6/1963 | Faust et al. | 204—143 |
| 3,151,387 | 10/1964 | Clemens et al. | 29—203 |
| 3,202,595 | 8/1965 | Inoue | 204—143 |
| 3,214,361 | 10/1965 | Williams | 204—224 |
| 3,219,564 | 1/1965 | Wilkinson | 204—143 |
| 3,332,863 | 7/1967 | Woods | 204—143 |

FOREIGN PATENTS

| | | |
|---|---|---|
| 21,004 | 11/1961 | Japan. |
| 471,897 | 3/1951 | Canada. |

ROBERT K. MIHALEK, *Primary Examiner.*

JOHN H. MACK, *Examiner.*